(12) United States Patent
Christiansen et al.

(10) Patent No.: US 12,631,862 B2
(45) Date of Patent: May 19, 2026

(54) INTRAORAL SCANNER WITH OPTICAL SYSTEM FOR MINIMIZING STRAY LIGHT

(71) Applicant: 3SHAPE A/S, Copenhagen K (DK)

(72) Inventors: Alexander Bruun Christiansen, Copenhagen Ø (DK); Christoph Vannahme, Holte (DK); Pétur Gordon Hermannsson, Copenhagen K (DK)

(73) Assignee: 3SHAPE A/S, Kobenhavn K (DK)

( * ) Notice: Subject to any disclaimer, the term of this patent is extended or adjusted under 35 U.S.C. 154(b) by 246 days.

(21) Appl. No.: 18/345,701

(22) Filed: Jun. 30, 2023

(65) Prior Publication Data

US 2024/0004175 A1 Jan. 4, 2024

(30) Foreign Application Priority Data

Jul. 4, 2022 (EP) ..................................... 22182925

(51) Int. Cl.
*G02B 21/00* (2006.01)
*G02B 1/115* (2015.01)
*G02B 5/30* (2006.01)

(52) U.S. Cl.
CPC .......... *G02B 21/0028* (2013.01); *G02B 1/115* (2013.01); *G02B 5/3083* (2013.01); *G02B 21/0032* (2013.01); *G02B 21/0064* (2013.01); *G02B 21/0068* (2013.01)

(58) Field of Classification Search
CPC ................ G02B 21/0028; G02B 1/115; G02B 5/3083; G02B 21/0032; G02B 21/0064; G02B 21/0068; A61B 1/00096; A61B 1/00163; A61B 1/00177; A61B 1/00186; A61B 1/00172; A61B 1/0638; A61B 1/0646; A61B 1/24
See application file for complete search history.

(56) References Cited

U.S. PATENT DOCUMENTS

| | | | | | |
|---|---|---|---|---|---|
| 6,436,541 | B1 * | 8/2002 | Sopko | ..................... | G02B 1/116 |
| | | | | | 359/359 |
| 7,312,924 | B2 * | 12/2007 | Trissel | ................. | A61C 9/0053 |
| | | | | | 359/489.08 |
| 9,019,576 | B2 | 4/2015 | Rosberg et al. | | |
| 11,357,404 | B2 | 6/2022 | Atiya et al. | | |

(Continued)

FOREIGN PATENT DOCUMENTS

| | | |
|---|---|---|
| EP | 2078493 A2 | 7/2009 |
| EP | 2442720 B1 | 8/2016 |
| WO | 2010145669 A1 | 12/2010 |

*Primary Examiner* — Mustak Choudhury
(74) *Attorney, Agent, or Firm* — BUCHANAN INGERSOLL & ROONEY PC

(57) ABSTRACT

The present disclosure relates to an intraoral scanning device including a light source configured for emitting light; a beam splitter configured for outputting linearly polarized light of a predefined orientation, wherein the beam splitter is arranged such that light from the light source is transmitted through the beam splitter; an image sensor configured for acquiring one or more images; and a light absorbing unit for minimizing stray light on the image sensor, said light absorbing unit arranged on a surface of the beam splitter. The present disclosure further relates to an optical system for an intraoral scanning device, said optical system configured for minimizing stray light in the system.

20 Claims, 5 Drawing Sheets

(56)                    References Cited

U.S. PATENT DOCUMENTS

| | | | |
|---|---|---|---|
| 2002/0097493 A1* | 7/2002 | Li | G02B 1/115 |
| | | | 252/582 |
| 2006/0072189 A1* | 4/2006 | DiMarzio | G02B 21/0036 |
| | | | 359/368 |
| 2014/0376064 A1* | 12/2014 | Rosberg | G01B 11/2513 |
| | | | 358/475 |
| 2022/0021807 A1 | 1/2022 | Weise et al. | |

* cited by examiner

INTRAORAL SCANNER WITH OPTICAL SYSTEM FOR MINIMIZING STRAY LIGHT

TECHNICAL FIELD

The present disclosure relates to an optical system for an intraoral scanning device, wherein the optical system is configured for minimizing stray light inside the scanning device. The present disclosure further relates to an intraoral scanning device for acquiring images inside the oral cavity of a subject. More particularly, the present disclosure relates to an intraoral scanning device having an optical system for minimizing stray light inside the scanning device.

BACKGROUND 3D-scanning is well-established in various industrial fields, such as within digital dentistry. Some 3D scanning technologies relate to triangulation and others relate to confocal, depth-from-focus, or depth-from-defocus. Triangulation is based on viewing a scene from one, two or more different directions being different from a light projection direction.

Confocal scanning can be mechanical or chromatic. In mechanical confocal scanning, an optical element, such as a lens is mechanically moved back and forth to scan a volume, while projected light is spatially filtered in the detector plane. In chromatic confocal scanning, a volume is scanned by illuminating light through a highly chromatic material and changing the scanning wavelength, while projected light is spatially filtered in the detector plane.

In depth-from-focus scanning, an optical element, such as a lens is also moved back and forth to scan a volume, and depth is estimated from a focus measure, without the need of spatially filtering. In depth-from-defocus, an optical property, such as the aperture, is changed between the capturing of two images, whereby depth is estimated by determining the degree of defocus between the two images.

Intraoral scanners based on depth-from-focus typically feature an optical imaging system comprising a beam splitter and an image sensor. Typically, depth-from-focus scanners utilize polarized light in order to enhance the specular reflection and suppress subsurface scattering from the object being scanned. The beam splitter is typically used to split an incident beam into two beams of differing polarization states.

It is of interest to develop an optical system for an intraoral scanning device that is able to minimize stray light in the optical system.

SUMMARY

Ideally, the only light present on the image sensor of an intraoral scanning device during scanning is light reflected from the object being scanned, such as light reflected from the teeth or gingiva of a subject. However, oftentimes the optical system creates stray light, which may be incident on the image sensor. Stray light may be understood as light in an optical system, which was not intended in the design. The stray light may origin from the intended source, but follow paths other than the intended. As an example, light emitted by a light source and then reflected by a beam splitter may be reflected again such that it is incident on the image sensor.

While techniques for minimizing stray light exist, there is a desire to develop improved systems for minimizing stray light. To minimize stray light, some existing optical imaging systems utilize one or more polarizing films in the optical path, which often absorb a lot of light in the short wavelength ranges. Consequently, it is more difficult to reproduce true colors of the scanned object. It is therefore of further interest to develop an optical imaging system for an intraoral scanning device that is better at reproducing colors, i.e. which has a higher color fidelity.

The present disclosure addresses the above-mentioned challenges by providing an intraoral scanning device for acquiring images inside the oral cavity of a subject, wherein the intraoral scanning device comprises a first light source for emitting light; a mask for patterning the light into a predefined pattern; a beam splitter, a light absorbing unit configured to absorb light reflected or transmitted by the beam splitter; and an image sensor configured to acquire one or more images.

In some embodiments, the scanning device comprises a first light source for emitting light; a mask for patterning the light into a predefined pattern; a beam splitter configured to split an incident beam of light into two beams, wherein at least one of said beams is linearly polarized; a light absorbing unit arranged on a surface of the beam splitter, said light absorbing unit comprising an antireflective coating and an absorbing layer configured to absorb light; an image sensor configured to acquire one or more images; and a waveplate, such as a quarter-wave plate configured to alter the polarization state of light travelling through the waveplate.

In some embodiments, the scanning device comprises a light source configured for emitting light; a beam splitter configured for outputting linearly polarized light of a predefined orientation, wherein the beam splitter is arranged such that light from the light source is transmitted through the beam splitter; an image sensor configured for acquiring one or more images; and a light absorbing unit for minimizing stray light on the image sensor, said light absorbing unit arranged on a surface of the beam splitter, said light absorbing unit comprising an antireflective coating and an absorbing layer configured to absorb stray light.

The scanning device disclosed herein has several advantages over existing scanning devices. One advantage is that by arranging a light absorbing unit near the beam splitter of the optical system/imaging system, e.g. on a surface of the beam splitter, the light absorbing unit is able to absorb a lot of light which might otherwise result in stray light in the optical system. Stray light may be understood as undesired light in the optical system; in particular, it is desired to minimize or entirely avoid stray light on the image sensor of the scanning device. An advantage of arranging/providing an antireflective coating on a surface of the beam splitter is that it allows more light to be transmitted into the absorbing layer for absorbing light. Thus, a beam splitter with an antireflective coating has the advantage of minimizing stray light on the image sensor, e.g. light reflected from a glass-air interface of the beam splitter, since the antireflective coating has the property of having a very low reflectance of light, such as visible light. In preferred embodiments, the reflection of visible light of the antireflective coating is below 5%, even more preferably below 2%, such as below 1%. The combination of an antireflective coating and an absorbing layer configured to absorb light is particularly advantageous, since the antireflective coating is suitable for allowing a high transmission of light into the absorbing layer, which is configured to absorb light.

In some embodiments, the intraoral scanning device further comprises a second light source configured to emit light at a second wavelength. As an example, the second wavelength may be selected from the range of 380 nm to 485 nm, such as from the range of 395 nm to 415 nm. Preferably, the second wavelength is selected such that it is able to excite fluorescent material present inside the oral cavity of the subject being scanned. Therefore, the second wavelength may also be referred to herein as an excitation wavelength. The fluorescent signal reflected back from the object is typically of a higher wavelength than the second wavelength/excitation wavelength.

A further advantage of utilizing the light absorbing unit is that a polarizing film, which is often placed in the optical path before the beam splitter, can be omitted. As previously mentioned, polarizing films, such as polymer-based polarizing films, have the drawback that they absorb quite a lot of light in the short wavelength ranges. By omitting the polarizing film, there are no absorption losses, which means that a lower excitation wavelength can be used, e.g. 405 nm. This in turn means that a long pass filter, e.g. arranged on a surface of the beam splitter facing the image sensor, can be configured such that it has a lower cut-off wavelength. This enables a higher color fidelity, as more blue light can be utilized when generating color based on reflected white light from the scanned object; consequently, the generated colors are more similar to the true colors of the scanned object. Thus, it is desirable to provide a scanning device without the polarizing film in order to transmit a broader range of wavelengths, such that reproduced colors can be improved.

In some embodiments, the intraoral scanning device further comprises a long pass filter arranged in front of the image sensor, wherein the long pass filter is configured to transmit wavelengths above the second wavelength. Since the presently disclosed scanning device allows the light to be transmitted through the mask without any polarizing film between the mask and the beam splitter, any absorption loss through the polarizing film is then entirely avoided. Consequently, a lower excitation wavelength may be utilized compared to the wavelength selected if the polarizing film is present. An advantage of utilizing a lower excitation wavelength, such as 405 nm, is that there are typically more cheaper available light sources in this range, compared to a higher wavelength. Thus, the presently disclosed scanning device offers a more cost-effective solution compared to existing scanners utilizing a polarizing film between the mask and the beam splitter.

A further advantage of utilizing a lower excitation wavelength is that the long pass filter in front of the image sensor can be shifted down, thereby allowing more wavelengths/colors to be transmitted through the filter and onto the image sensor. This enables a higher color fidelity, wherein colors are more accurately reproduced. This is illustrated in FIGS. 7A-7B. In the color photograph on the left (FIG. 7A), the light on the image sensor is yellow-greenish, whereas in the color photograph on the right (FIG. 7B), the light on the image sensor is white-bluish.

In some existing scanning devices, a mask having a patterned chrome layer is used. Such chrome masks have the drawback that they absorb a broad wavelength range in the chrome layer. It is desired that it is only the light from the first light source, which is patterned. Thus, the light from the second light source should preferably be transmitted through the mask with ideally no absorption in the masking material. In some embodiments, the mask of the scanning device comprises a masking material configured to have a low transmission of light emitted by the first light source, such that said light is patterned into a predefined pattern, wherein the masking material is configured to have a high transmission of the second wavelength. Thus, the masking material may constitute an optical short pass filter, which allows the second wavelength to be transmitted with ideally zero absorption. An advantage hereof, is that the signal-to-noise ratio of the fluorescence signal is increased.

The mask may be manufactured by coating the entire surface of the mask with a dielectric low pass filter coating, and subsequently masking the coating using photolithography, followed by a physical or chemical etching step or a lift-off process, thereby generating the desired pattern.

As an example, the pattern may be a checkerboard pattern. The dielectric low pass filter coating is preferably configured to have a high transmission of light of the second wavelength, such that the excitation signal is transmitted through the mask without being structured/patterned.

In yet another embodiment, the intraoral scanning device comprises a first light source for emitting light, e.g. at a first range of wavelengths; a second light source configured to emit light at a second wavelength, wherein the second wavelength is selected from the range of 380 nm to 485 nm; a mask for patterning the light into a predefined pattern, wherein the mask comprises a masking material configured to have a low transmission of light emitted by the first light source, such that said light is patterned into the predefined pattern, and wherein the masking material is configured to have a high transmission of the second wavelength; a beam splitter configured to split an incident beam of light into two beams, wherein at least one of said beams is linearly polarized; a light absorbing unit comprising an antireflective coating arranged on a surface of the beam splitter, wherein the reflection of visible light of the antireflective coating is below 5%, wherein the light absorbing unit further comprises an absorbing layer configured to absorb light; the scanning device further comprising an image sensor configured to acquire one or more images; a long pass filter arranged in front of the image sensor, wherein the long pass filter is configured to transmit wavelengths above the second wavelength; and a waveplate configured to alter the polarization state of light travelling through the waveplate.

In some embodiments, the intraoral scanning device further comprises a reflecting element located in a probe of the scanning device, and wherein the waveplate, such as a quarter-wave plate, is located in the probe. The intraoral scanning device may further comprise a sleeve which is configured to be removably mounted to the scanning device, such that the sleeve covers the probe when mounted. The sleeve may comprise an optical window configured to transmit light from the first light source and/or from the second light source, wherein the optical window is configured to maintain the polarization state of light passing through the window.

An advantage of positioning the waveplate, e.g. the quarter-wave plate, in a distal end of the probe, preferably parallel to a longitudinal axis of the scanning device, is that fewer reflections from surfaces will end at the image sensor, because the reflected light will be polarized such that it will not be reflected up to the image sensor by the beam splitter. An advantage of positioning the waveplate such that the projected light is reflected first by the reflecting element and then transmitted through the waveplate, is that it allows for a simpler design of the reflecting element, since in this case the reflecting element does not need to fulfill requirements for the relative phase between s- and p-polarization of the light. In other words, in this case the reflecting element does not need to be configured to maintain the circular polarization of the light, e.g. using a specific coating; rather, the reflecting element only needs to maintain the linear polarization of the light, which is the case for most reflecting elements, such as dielectric mirrors.

The present disclosure further relates to an optical system for an intraoral scanning device, the optical system comprising:

a multichromatic light source for emitting light;

a mask for patterning the light into a predefined pattern;

a beam splitter configured to split an incident beam of light into two beams, wherein at least one of said beams is linearly polarized, wherein the beam splitter is made from two glass prisms attached together to form an interface, the beam splitter comprising:

a coating on the interface, wherein the coating is configured to separate unpolarized light into two different polarizations, whereby light of a first polarization state is transmitted through the interface and light of a second polarization state is reflected at the interface;

a long pass filter having a predefined cut-off wavelength, such that wavelengths below said cut-off wavelength are blocked by the filter, wherein the long pass filter is arranged on a first surface of the beam splitter;

alight absorbing unit comprising an absorbing layer for absorbing light, wherein the light absorbing unit is arranged on a second surface of the beam splitter;

wherein the long pass filter and the light absorbing unit are integrated in the beam splitter to form a single unit.

The disclosure further relates to an intraoral scanning device comprising the optical system disclosed herein. Accordingly, the scanning device disclosed herein provides a number of advantages compared to existing scanning devices.

DETAILED DESCRIPTION

Dental Object

Figure 1:
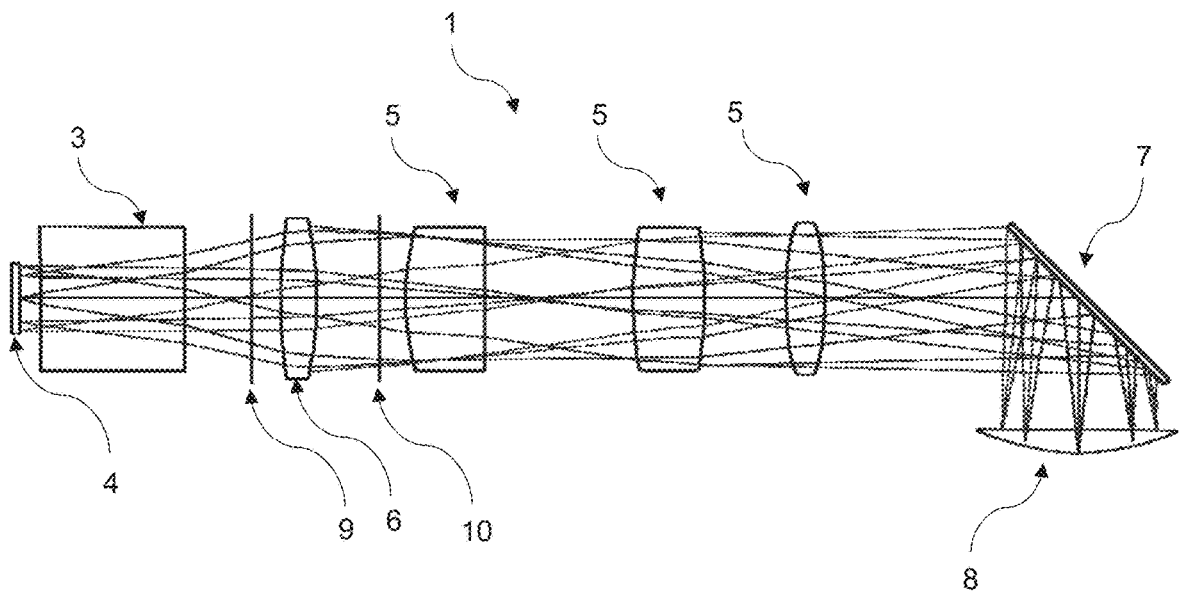
FIG. 1 shows an embodiment of a scanning device according to the present disclosure.

The three-dimensional dental object may be an intraoral dental object of a patient, said dental object comprising e.g. teeth and/or gingiva of the patient. Such an intraoral dental object may further comprise other objects/materials inside the patient's oral cavity, for example implants or dental restorations. The dental object may only be a part of the patient's teeth and/or oral cavity, since the entire set of teeth of the patient is not necessarily scanned during each scanning session. Examples of dental objects include one or more of: tooth/teeth, implant(s), dental restoration(s), dental prostheses, edentulous ridge(s), and combinations thereof. Alternatively, the dental object may be a gypsum/plaster model representing a patient's teeth.

Scanning Device

The scanning device may employ a scanning principle such as triangulation-based scanning, confocal scanning, focus scanning, ultrasound scanning, x-ray scanning, stereo vision, structure from motion, optical coherence tomography (OCT), or another scanning principle. The scanning device may be an intraoral scanning device for acquiring images inside the oral cavity of a subject. Preferably, the scanning device is a handheld intraoral scanning device. In an embodiment, the scanning device is operated by projecting a pattern and translating a focus plane along an optical axis of the scanning device while capturing a plurality of 2D images at different focus plane positions such that each series of captured 2D images forms a stack of 2D images. In preferred embodiments, the scanning device comprises a processor configured to process the stack of 2D images to generate processed data, wherein depth information can be inferred from the processed data. In some embodiments, the processed data is 3D data. Alternatively, 3D data may be generated based on the stack of 2D images or based on the processed data. Thus, the scanning device may be an intraoral 3D scanning device configured to generate a 3D representation of an object, such as a dental object.

In some embodiments, the scanning device is configured to generate 3D data based on a predefined selected wavelength or range of wavelengths. As an example, the scanning device may be configured to generate 3D data based on a green part of the visible spectrum, e.g. wavelengths of about 500-565 nm. As another example, the scanning device may be configured to generate 3D data based on wavelengths of about 625-750 nm. In other words, in some embodiments only a specific component/part of the acquired light is utilized for deriving surface geometry information of the scanned object. In some embodiments, this is achieved by utilizing an image sensor with a color filter array, such as a Bayer filter.

In some embodiments, the surface geometry information is derived from light in a selected wavelength range of the spectrum provided by a multichromatic light source. In this case, the light in the other wavelength ranges is not used to derive the surface geometry information. This provides the advantage that chromatic dispersion of optical elements in the optical system of the scanning device does not influence the scanning of the object.

In preferred embodiments, the scanning device is a focus scanning device configured to shift a focal plane of light projected by the scanning device. In preferred embodiments, the shift of focal plane is achieved by a focus lens configured to, during operation, translate back and forth along a predefined distance. In some embodiments, the predefined distance is between 1 mm and 10 mm, preferably between 1 mm and 5 mm, even more preferably between 2 mm and 4 mm.

The acquired 2D images may also be referred to herein as raw 2D images, wherein raw in this context means that the images have not been subject to image processing. The focus plane position is preferably shifted along the optical axis of the scanning device, such that 2D images captured at a number of focus plane positions along the optical axis form said stack of 2D images (also referred to herein as a sub-scan) for a given view of the object, i.e. for a given arrangement of the scanning device relative to the object. After moving the scanning device relative to the object or imaging the object at a different view, a new stack of 2D images for that view may be captured. The focus plane position may be varied by means of at least one focus element, e.g. the focus lens as mentioned elsewhere.

The scanning device is generally moved and angled during a scanning session, such that at least some sets of sub-scans overlap at least partially, in order to enable stitching in the post-processing. The result of stitching is the digital 3D representation of a surface larger than that which can be captured by a single sub-scan, i.e. which is larger than the field of view of the scanning device. Stitching, also known as registration, works by identifying overlapping regions of 3D surface in various sub-scans and transforming sub-scans to a common coordinate system such that the overlapping regions match, finally yielding a digital 3D representation. An Iterative Closest Point (ICP) algorithm may be used for this purpose. Another example of a scanning device is a triangulation scanner, where a time varying pattern is projected onto the dental object and a sequence of images of the different pattern configurations are acquired by one or more cameras located at an angle relative to the light projector.

Light Projectors

The scanning device may comprise one or more light projectors configured to generate an illumination pattern to be projected on a three-dimensional dental object. The light projector(s) preferably comprises a light source, a mask having a spatial pattern, and one or more lenses such as collimation lenses, focus lenses, projection lenses, and/or combinations thereof. The scanning device may comprise further light sources which are not placed behind a mask.

Light Sources

One or more light sources of the scanning device may be configured to generate light of a single wavelength or a combination of wavelengths (mono- or polychromatic). In some embodiments, the scanning device comprises a first light source for emitting light. In preferred embodiments, the emitted light from the first light source is unpolarized. The first light source may be configured to emit white light. White light may be understood herein as light of wavelengths from about 380 nm to about 750 nm. As an example, the first light source may be a white light-emitting diode (LED). The first light source may be a multichromatic light source. As further examples, the white light-emitting diode (LED) may be a phosphor LED or an indium gallium nitride (InGaN) LED.

In some embodiments, the first light source is a laser. The laser may be configured to emit light at a single wavelength or light having a narrow wavelength spectrum. As an example, the laser may be configured to emit light of a wavelength selected from the range of 625 nm to 850 nm.

As an example, a combination or range of wavelengths may be produced by using a light source configured to produce light (such as white light) comprising different wavelengths. Alternatively, the light projector(s) may comprise multiple light sources such as LEDs individually producing light of different wavelengths (such as red, green, and blue) that may be combined to form light comprising the different wavelengths. Thus, the light produced by the light source(s) may be defined by a wavelength defining a specific color, or a range of different wavelengths defining a combination of colors such as white light.

In an embodiment, the scanning device comprises a second light source configured for emitting light of a second wavelength or wavelength range. The emitted light from the second light source may be unpolarized. In preferred embodiments, the second wavelength is configured to excite fluorescent material inside the oral cavity of the subject, to obtain fluorescence data from the dental object. As an example, the second wavelength may be configured to excite bacteria in the oral cavity, whereby said bacteria fluoresces back with a wavelength higher than the second wavelength. In some embodiments, the second wavelength is selected from a range of 380 nm to 485 nm, or a narrower range such as 400 nm to 435 nm, or an even narrower range such as 405 nm to 425 nm. In preferred embodiments, the scanning device comprises a second light source configured for emitting light at a wavelength of approximately 405 nm. The second light source may emit light having a spectrum with a narrow band of wavelengths around a peak of the spectrum. As an example, the second light source may emit light with a range of wavelengths from about 400 nm to about 435 nm, wherein a peak of the spectrum is located about 405 nm. In some embodiments, the second light source is configured to emit light having an emission maximum (peak) within a subrange of the wavelength range emitted by the first light source.

Furthermore, the scanning device may comprise one or more additional light sources, such as an infrared (IR) light source, or a near-infrared (NIR) light source, wherein the light from said IR/NIR light sources is capable of penetrating dental tissue. Infrared light may be understood as light with a wavelength selected from the range of 700 nm to 1 mm. Near-infrared light may be understood as light with a wavelength selected from the range of 750 nm to 1.4 µm.

The light projector(s) may be digital light processing (DLP) projectors using a micro mirror array for generating a time varying pattern, or a diffractive optical element (DOF), or front-lit reflective mask projectors, or micro-LED projectors, or liquid crystal on silicon (LCoS) projectors or back-lit mask projectors, wherein a light source is placed behind a mask having a spatial pattern, whereby the light projected on the surface of the dental object is patterned.

The pattern may be dynamic, i.e. such that the pattern changes over time, or the pattern may be static in time, i.e. such that the pattern remains the same over time. The light projector(s) may comprise a collimation lens for collimating the light from the light source, said collimation lens being placed between the light source and the mask.

Mask

The scanning device may comprise a mask defining a spatial pattern for patterning light transmitted through the mask. As an example, the mask may define a checkerboard pattern, such that the generated illumination pattern is a checkerboard pattern. Alternatively, the mask may feature other patterns such as lines, dots, triangles, etc. As an example, the pattern may comprise a plurality of repeating units, wherein each repeating unit comprises a predefined number of polygons, wherein the repeating units are repeated throughout the pattern. Alternatively, the pattern may comprise a predefined arrangement comprising any of stripes, squares, dots, triangles, rectangles, and/or combinations thereof. In some embodiments, the pattern is non-coded, such that no part of the pattern is unique.

In preferred embodiments, the mask comprises a masking material configured to have a low transmission of light emitted by the first light source, such that said light is patterned into a predefined pattern. Ideally, the masking material is configured such that it completely blocks light from the first light source, such as from a white light source, whereby said light is structured into a pattern. In some embodiments, the masking material constitutes or comprises an optical short pass filter configured to have a high transmission of the second wavelength. In other words, the mask may in some embodiments be highly transparent to light of the second wavelength, such as blue light, while the mask is further configured to structure light of the first range of wavelengths, such as white light, into a pattern. In some embodiments, the mask is bonded to a surface of the beam splitter.

The scanning device preferably further comprises optical components for directing the light from the one or more light sources to the surface of the dental object. The specific arrangement of the optical components depends on whether the scanning device is a focus scanning apparatus, a scanning device using triangulation, or any other type of scanning device. A focus scanning apparatus is further described in WO 2010/145669 A1 "Focus scanning apparatus" filed on 17 Jun. 2010 by the same applicant, which is incorporated herein by reference in its entirety. In some embodiments, one or more optical components of the intraoral scanning device are configured to be transparent to light of the second wavelength. An example of said optical components include: the mask, the beam splitter, the antireflective coating(s), the quarter-wave plate, and the optical window. In some embodiments, all of the optical components of the scanning device are configured to be transparent to light of the second wavelength, wherein said components at least include the mask, the beam splitter, the antireflective coating(s), the quarter-wave plate, and the optical window.

Image Sensor

The light reflected from the dental object in response to the illumination of the dental object is directed, using optical components of the scanning device, towards one or more image sensor(s) in the scanning device. In preferred embodiments, there is only one image sensor in the scanning device. The image sensor(s) are configured to generate a plurality of images based on the incoming light received from the illuminated dental object. The image sensor may be a high-speed image sensor such as an image sensor configured for acquiring images with exposures of less than $\frac{1}{500}$ second or frame rates in excess of 100 frames pr. second (fps). In some embodiments, the image sensor is configured for acquiring images with exposures of less than $\frac{1}{1000}$ second or frame rates in excess of 250 frames pr. second (fps). In other embodiments, the image sensor is configured for acquiring images with exposures of less than $\frac{1}{1000}$ second or frame rates in excess of 500 frames pr. second (fps). As an example, the image sensor may be a rolling shutter (CCD) or global shutter sensor (CMOS).

The image sensor(s) may be a monochrome sensor including a color filter array such as a Bayer filter and/or additional filters that may be configured to substantially remove one or more color components from the reflected light and retain only the other non-removed components prior to conversion of the reflected light into an electrical signal. For example, such additional filters may be used to remove a certain part of a white light spectrum, such as a blue component, and retain only red and green components from a signal generated in response to exciting fluorescent material of the teeth. In some embodiments, a linear polarizer is attached or bonded to the image sensor. The linear polarizer may be a polymer foil. A linear polarizer may be understood as an optical component configured to transmit only a certain orientation of linearly polarized light. An advantage of including a linear polarizer on the image sensor is that it further filters out stray light.

Beam Splitter

In preferred embodiments, the scanning device comprises a beam splitter. A beam splitter may be understood as an optical device configured to split a beam of light in two beams. The beam splitter may be made from two triangular glass prisms which are attached together at their base. The face where the two triangular glass prisms are attached may form an interface, where incident light may be transmitted and/or reflected. The interface may be coated with a coating. The coating may be configured to allow light within a certain range of wavelengths of a certain polarization to pass. Thus, the beam splitter may be configured to accept light of a certain range of wavelengths, e.g. being unpolarized, and then output/transmit light of the same wavelengths of linear polarization. In some embodiments, the scanning device comprises an infrared (IR) or near-infrared (NIR) light source configured to emit infrared light. In such cases, the beam splitter may be configured as a polarizing beam splitter for the IR/NIR light depending on the placement of the IR/NIR light source.

The beam splitter may be configured such that the polarization of two exiting beams from the beam splitter are orthogonal to each other, e.g. one beam of horizontally linearly polarized light and another beam of vertically linearly polarized light. Thus, the beam splitter may be a polarizing beam splitter. The beam splitter may be configured to receive an incident beam of light and output two beams of light, wherein at least one of said beams is linearly polarized. Thus, the beam splitter may be configured to receive unpolarized light and output linearly polarized light of two different orientations. The beam splitter may be a beam splitter cube comprising six square faces. The inside of the beam splitter cube may comprise an interface where the two triangular glass prisms are attached together. Preferably, the beam splitter is configured to transmit linearly polarized light of a first orientation, e.g. vertical, and further configured to reflect linearly polarized light of a second orientation, e.g. horizontal. The light projected towards the distal end of the scanning device may be linearly polarized of a first orientation, whereas light returning from the object throughout the optical system may be linearly polarized of a second orientation (e.g. due to a quarter-wave plate), wherein the beam splitter is configured to reflect the light of the second orientation onto the image sensor of the scanning device.

The beam splitter may have a predefined refractive index selected from a range of 1.4 to 2.2, such as from 1.6 to 2.0, such as from 1.7 to 1.9, preferably from 1.83 to 1.87. The refractive index may be measured at a certain wavelength or range of wavelengths, such as measured at approximately 587 nm. The beam splitter may be made from a lead-based industrial glass such as lead(II) oxide (also known as lead monoxide). Accordingly, the beam splitter may comprise a glass type with a lead oxide component. Preferably, the material of the beam splitter is selected to have high transmission values in the visible spectral range and/or in a blue-violet range and/or in the infrared range. The visible spectral range may be understood as wavelengths from about 380 nm to about 750 nm. The blue-violet range may be understood as wavelengths from about 380 nm to about 485 nm.

In some embodiments, the beam splitter has a high refractive index, such as more than 1.5, such as more than 1.6, more optimally more than 1.8, most optimally around 1.85, particularly at a wavelength of approximately 587.6 nm. With such a high refractive index, the incoming rays inside the beam splitter are reduced. A beam splitter having a high refractive index has the technical effect of reducing the ray angle of rays incident on the beam splitter interface (i.e. the interface along the diagonal inside the beam splitter). It is an advantage that the rays incident on the interface have a low angle (when measured relative to the optical axis), e.g. close to parallel to the optical axis of the optical system. One reason is that any design of a coating present on this interface has to take into account both the wavelength(s) of the incident light as well as the incident ray angle(s). Therefore, a beam splitter with a high refractive index will simplify and/or enable an improved design of the aforementioned coating on the interface. As an example, an improved extinction ratio of the beam splitter may be achieved.

In general, beam splitters such as polarizing beam splitters are not perfect, i.e. they are not 100% effective in separating unpolarized light into two different polarizations. Typically, a polarizing beam splitter is characterized by an extinction ratio, which may be understood as the ratio between the transmission coefficients of the two different polarizations (e.g. s and p polarizations). As an example, the beam splitter may have an extinction ratio of between 1:500 to about 1:2000. An extinction ratio of 1:500 implies that 99.8% of the light transmitted through the beam splitter (i.e. the outputted light) will be of a certain pre-defined polarization (e.g. s polarization), and 0.2% will be of a polarization, which was supposed to have been reflected by the beam splitter (e.g. p polarization).

Light Absorbing Unit

The beam splitter may comprise a light absorbing unit configured to absorb light. The light absorbing unit may be configured to absorb light either reflected by the beam splitter or transmitted through the beam splitter, depending on the configuration of the optical system. However, the light absorbing unit is preferably placed such that stray light on the image sensor is minimized, ideally no stray light is present on the image sensor. The light absorbing unit may be integrated in the beam splitter, e.g. physically integrated on a surface of the beam splitter. As an example, the light absorbing unit may be bonded to the beam splitter. The light absorbing unit may be arranged on a second surface of the beam splitter, such as on a surface opposite the first surface or adjacent to the first surface of the beam splitter.

As an example, the beam splitter may be made from two triangular glass prisms defining an interface at their base, where they are attached to each other. The assembled triangular glass prisms may form a cube. In some embodiments, the beam splitter is configured to receive incident light through one surface of the beam splitter and then split the incident light in two beams; one of which is reflected at the interface inside the beam splitter and the other being transmitted. In some embodiments, the transmitted light may exit the beam splitter at a surface opposite the surface through which the incident light is transmitted. The reflected light may exit the beam splitter at another surface of the beam splitter. At least one purpose of the absorbing unit is to absorb light which has been reflected at the aforementioned interface. This can be achieved by placing the light absorbing unit on or near the surface through which the reflected light beam exits the beam splitter.

At least one technical effect of a beam splitter with a light absorption unit, wherein said light absorption unit is configured to absorb light reflected by the beam splitter, is that stray light on the image sensor is minimized. Ideally, no stray light is present on the image sensor. Stray light may be understood as non-intended light incident on the image sensor in the optical system. As an example, without the light absorbing unit, light may be reflected first at the interface inside the beam splitter, and then said light may be reflected a second time at a surface of the beam splitter. If said surface is located opposite the image sensor, there is a risk that said reflected light will be incident on the image sensor, which is not desired. Preferably, only light reflected from the dental object being scanned/imaged is captured by the image sensor. Alternatively, a light source may be placed above the beam splitter, such that the beam splitter is configured to reflect light from said light source, i.e. alter the direction of a light beam entering the beam splitter. In that case, the image sensor and light absorbing unit are not placed opposite each other. In this case, the light absorbing unit is placed such that it absorbs light transmitted through the beam splitter, whereby stray light onto the image sensor is minimized.

Antireflective Coating

The light absorbing unit may comprise an antireflective (AR) coating. The antireflective coating is preferably configured to have a high transmission of light through the coating, such as a high transmission of visible light. In other words, the antireflective coating is preferably configured to have a low reflection of light, such as visible light, e.g. white light and/or blue light. In some embodiments, the antireflective coating is configured such that the reflection of visible light of the antireflective coating is below 5%, preferably below 2%, even more preferably below 1%. The antireflective coating may be configured such that the reflection of light of a predefined wavelength range, such as light between 400 nm to 750 nm, is below 5%, preferably below 2%, even more preferably below 1%. The predefined wavelength range may be 300 nm to 850 nm, such as 350 nm to 800 nm, such as 400 nm to 750 nm.

The antireflective coating may comprise one or more layers, such as a plurality of layers. The layers may be made from different materials. Preferably, the materials of the layers have different optical properties, e.g. in terms of refractive indices. As an example, the antireflective coating may constitute a gradient-index (GRIN) coating, which has a nearly continuously varying index of refraction. In case of a GRIN coating, the AR coating comprises only one layer. As another example, the antireflective coating may constitute a moth-eye nanostructure.

The antireflective coating may comprise transparent thin film structures with alternating layers of contrasting refractive index. The layer thicknesses may be chosen to produce destructive interference in the beams reflected from the interfaces of the layers, and constructive interference in the corresponding transmitted beams. In some embodiments, the antireflective coating comprises a plurality of alternating layers of different material and/or of different refractive index. As an example, the antireflective coating may comprise at least two layers, wherein the two layers have different optical properties. Specifically, the antireflective coating may comprise at least two layers, wherein the layers have different refractive indices.

In some embodiments, the antireflective coating comprises a first layer having a first refractive index, and a second layer having a second refractive index. Preferably, the first refractive index is lower than the second refractive index. The first and second layers may define a repeating unit, which is repeated a predefined number of times to form a coating comprising more than two layers. In preferred embodiments, the antireflective coating is arranged such that the first layer is directly interfaced with one side of the beam splitter, such as arranged on a surface of a beam splitter cube. Thus, in some embodiments the AR coating is arranged such that a layer having a low refractive index, such as approximately 1.5, is placed directly against a surface of the beam splitter. The first refractive index may be selected from a first range of refractive indices, such as between 1.3 and 1.7, preferably between 1.4 and 1.6, preferably approximately 1.5. The second refractive index may be selected from a second range of refractive indices, such as between 1.5 and 1.9, preferably between 1.6 and 1.8, preferably approximately 1.7. Ideally, the refractive indices of the layers are chosen to produce a high contrast on the interfaces between the layers. Thus, if the beam splitter has a high refractive index (e.g. above 1.8), the first layer (placed directly against the beam splitter) is preferably of a relatively low refractive index, such as between 1.4 and 1.6. The refractive index of the next layer should then be selected higher to produce a high contrast. As yet another example, the AR coating may comprise further layers in addition to the at least two layers. For instance, the AR coating may comprise a plurality of layers, wherein a repeating unit of two layers is repeated a predefined number of times to define the coating.

In some embodiments, the AR coating comprises a plurality of layers, such as at least three layers. The layers may have different optical properties, e.g. achieved by selecting materials having different refractive indices. In some embodiments, the AR coating comprises at least three layers, wherein a first layer has a first refractive index selected from a first range of refractive indices, and wherein a second layer has a second refractive index selected from a second range of refractive indices, and wherein a third layer has a third refractive index selected from a third range of refractive indices. As indicated above, the first refractive index may be selected from a first range of refractive indices, such as between 1.3 and 1.7, preferably between 1.4 and 1.6, preferably approximately 1.5. The second refractive index may be selected from a second range of refractive indices, such as between 1.5 and 1.9, preferably between 1.6 and 1.8, preferably approximately 1.7.

The antireflective coating may comprise one or more materials selected from the group of: Magnesium fluoride ($MgF_2$), Cerium(II) fluoride ($CeF_3$), Lanthanum trifluoride ($LaF_3$), Neodymium(II) fluoride ($NdF_3$). Lead(II) fluoride ($PbF_2$), Ytterbium(II) fluoride ($YbF_3$), Yttrium(III) fluoride ($YF_3$), Silicon dioxide ($SiO_2$), Aluminium(III) oxide ($Al_2O_3$), Yttrium(III) oxide ($Y_2O_3$), Silicon monoxide (SiO), Hafnium(IV) oxide ($HfO_2$), Tantalum pentoxide ($Ta_2O_5$), Titanium dioxide ($TiO_2$), Zinc selenide (ZnSe), Zinc sulfide (ZnS), and/or combinations thereof. The antireflective coating may comprise one or more layers of different materials, such as a first layer made from an oxide mixture, and a second layer made from a fluoride. Alternatively, the AR coating may comprise two or more layers, wherein the layers comprise different materials selected from fluorides, oxide mixtures, selenides & sulfides, and/or combinations thereof. In some embodiments, the AR coating comprises at least three layers, wherein a first and a second layer comprises a material selected from a group of oxide mixtures, and wherein a third layer comprises a material selected from a group of fluorides. In some embodiments, the antireflective coating comprises a layer of tantalum pentoxide ($Ta_2O_5$), a layer of silicon dioxide ($SiO_2$), and a layer of magnesium fluoride ($MgF_2$).

Figure 3:
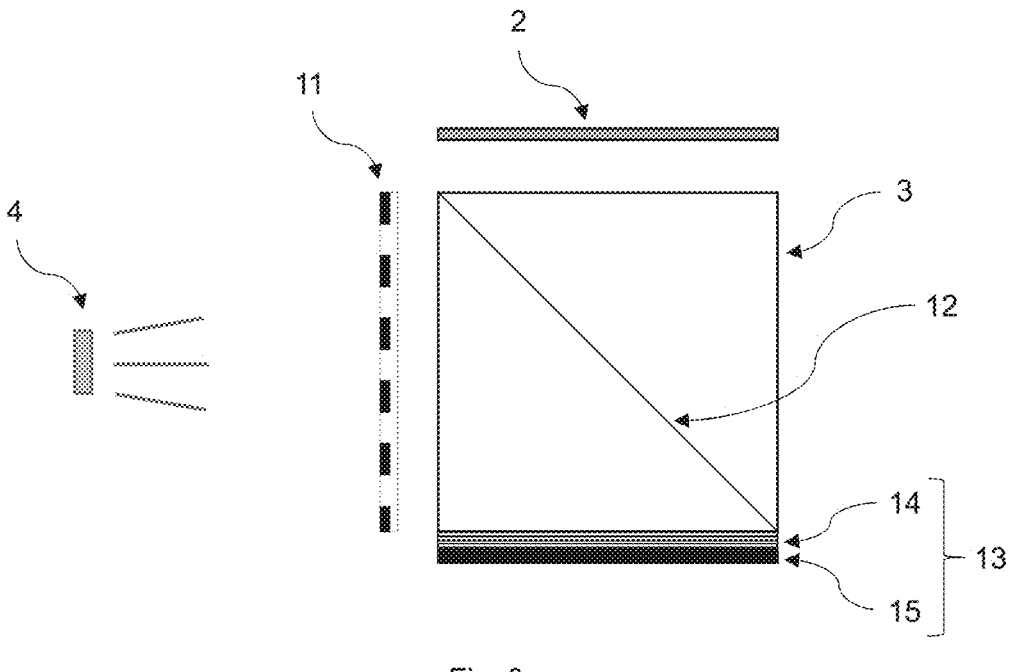
FIG. 3 shows an example of an arrangement of some components configured to form part of the scanning device according to the present disclosure.
Figure 4:
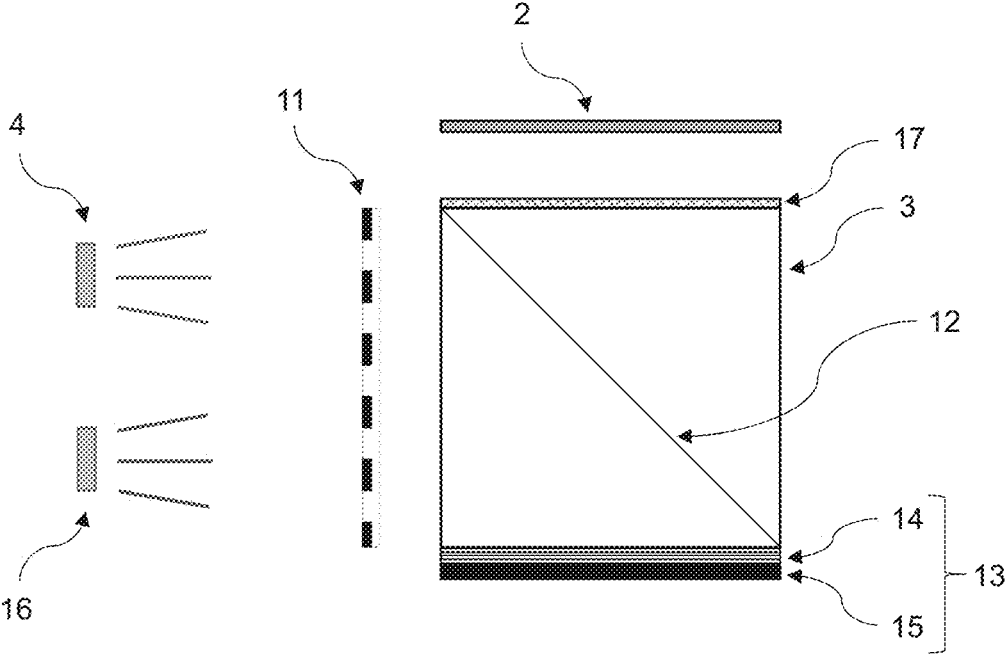
FIG. 4 shows a largely similar arrangement as shown in FIG. 3; however, in this embodiment the scanning device further comprises a second light source and a long pass filter.
Figure 5:
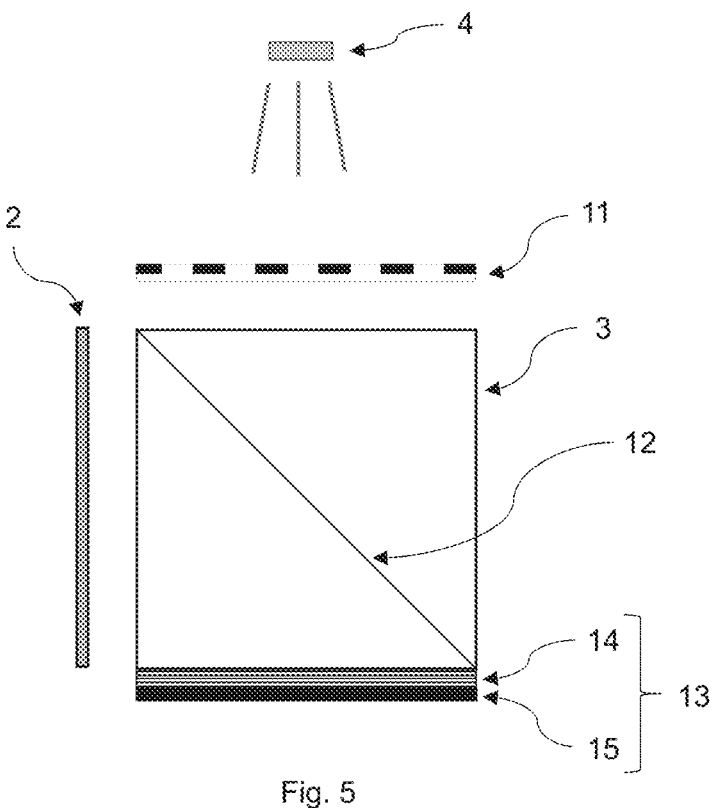
FIG. 5 shows an example of an arrangement of some components configured to form part of the scanning device according to the present disclosure.
Figure 6:
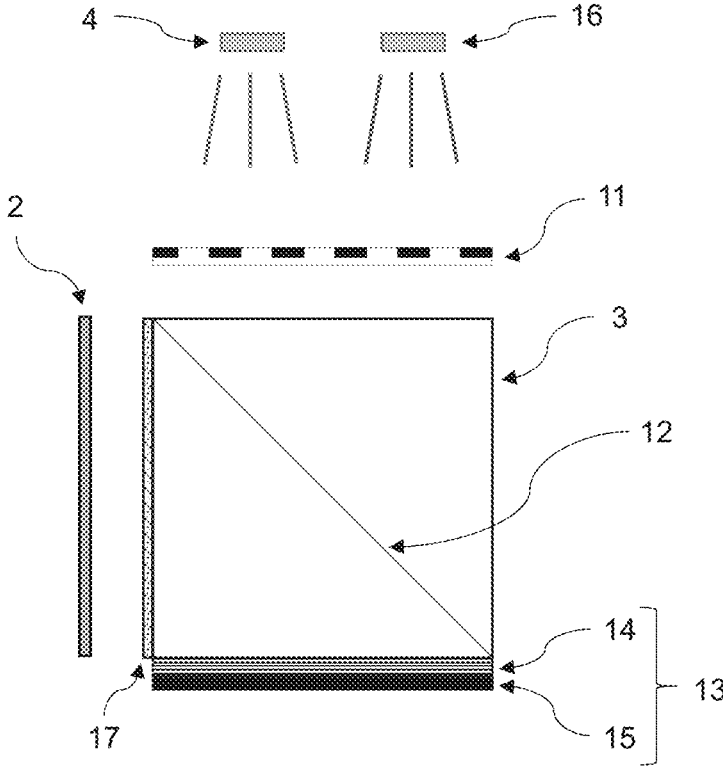
FIG. 6 shows a largely similar arrangement as shown in FIG. 5; however in this embodiment the scanning device further comprises a second light source and a long pass filter.

The antireflective coating may form part of the beam splitter, i.e. the beam splitter and the antireflective coating may form a single unit. Thus, the antireflective coating may be physically integrated on a surface of the beam splitter. Additionally, the long pass filter may be integrated in a surface of the beam splitter. As an example, the long pass filter may be bonded to a first surface of the beam splitter and the antireflective coating may be bonded to a second surface of the beam splitter. In some embodiments, the first and second surfaces are opposite to each other, as illustrated in FIGS. 3-4. In other embodiments, the first and second surfaces are adjacent to each other, as illustrated in FIGS. 5-6.

Absorbing Layer

The light absorbing unit may further comprise an absorbing layer configured to absorb light. The absorbing layer is preferably arranged such that it absorbs light either reflected by the beam splitter or transmitted through the beam splitter, depending on the configuration of the optical system. Accordingly, the light absorbing unit may comprise an antireflective coating, as described herein, and it may further comprise an absorbing layer as described herein.

In preferred embodiments, the antireflective coating is arranged between the beam splitter and the absorbing layer, such that light transmitted through the antireflective coating is transmitted into the absorbing layer. The beam splitter and the light absorbing unit may form a single unit. As an example, such a single unit may be formed by first providing a beam splitter, such as a beam splitter cube and then coating at least one side/surface of the beam splitter with an antireflective coating as described herein. Then, an absorbing layer, such as a metal layer, may be evaporated or vapor deposited onto the antireflective coating to form the light absorbing unit. Thus, the beam splitter and light absorbing unit may be manufactured to form one optical unit/a single unit. The long pass filter may be part of the beam splitter; thus, the long pass filter may be physically integrated in the beam splitter, such as on a surface of the beam splitter. As an example, the long pass filter may be bonded to the beam splitter. The long pass filter may be arranged on a first surface of the beam splitter, such as on a surface facing the image sensor of the optical system/scanning device.

There are several suitable materials to be used for the absorbing layer. As an example, the absorbing layer may comprise, or be made entirely from, a material selected from the group of black lacquer, carbon, aluminum (Al), silver (Ag), chromium (Cr), colored glass, an opaque material, and/or combinations thereof. Other metals may be used as well. In some embodiments, the absorbing layer has an absorbance of 2 OD (optical density), preferably 3 OD or higher. An optical density of 3 OD corresponds to a transmission through the absorbing layer of 0.001 (0.1%) or less. The absorbance of 3 OD or higher may be for a wavelength range of 400 nm to 750 nm.

In preferred embodiments, the light absorbing unit comprises both an antireflective coating and an absorbing layer, wherein the antireflective coating is arranged between the beam splitter and the absorbing layer, such that light transmitted through the antireflective coating is transmitted into the absorbing layer. In other embodiments, the light absorbing unit comprises only an absorbing layer without the antireflective coating. As an example, the absorbing layer may be an absorbing glass having the same refractive index as the beam splitter. The absorbing glass may be attached to the beam splitter via a layer of optical cement having the same refractive index as the beam splitter. The absorbing glass may be black, e.g. due to an added material such as carbon.

Probe

The scanning device may comprise a probe suitable for being inserted in the oral cavity of a subject. In preferred embodiments, the probe is fixed to the scanning device. The probe may define a housing suitable for housing one or more components, such as one or more optical components. The probe and/or the scanning device may define a longitudinal axis. In preferred embodiments, at least one optical axis of the imaging system is substantially parallel to the longitudinal axis of the scanning device. Thus, the imaging system may be configured to project light along the longitudinal axis; however, the imaging system may comprise further optical components configured to change the direction of the projected light or light reflected from a scanned object, such as a light reflected from a dental object.

Waveplate

The scanning device may further comprise a waveplate, such as a quarter-wave plate (QW plate), configured to alter the polarization state of light travelling through the waveplate. The waveplate may be positioned in the probe of the scanning device, such as in a distal end of the probe of the scanning device. An advantage of positioning the waveplate, e.g. the QW plate, in a distal end of the probe is that fewer reflections from surfaces will end at the image sensor, because the reflected light will be polarized such that it will not be reflected up to the image sensor by the beam splitter.

The waveplate may be a quarter-wave plate, which is configured to convert linearly polarized light into circularly polarized light and vice versa. Alternatively, the waveplate may be a half-wave plate configured to shift the polarization direction of linearly polarized light. In preferred embodiments, the waveplate is a quarter-wave plate, which is positioned in the probe. In preferred embodiments, the light being transmitted through the beam splitter is linearly polarized in a first orientation. This light will then be converted to circularly polarized light when being transmitted through the quarter-wave plate. Once the circularly polarized light is incident on the object to be scanned and is reflected from said object towards the scanning device, the circularly polarized light will be converted back to linearly polarized light. However, the linearly polarized light will be of a second orientation, typically orthogonal to the first orientation, after having passed the quarter-wave plate two times. Once the linearly polarized light of the second orientation interacts with the beam splitter it can be reflected onto the image sensor, whereby an image can be obtained. The waveplate may be constructed out of a birefringent material (such as quartz or mica, or even plastic). Furthermore, the waveplate may be constructed out of a material for which the index of refraction is different for light linearly polarized along one or the other of two certain perpendicular crystal axes.

The waveplate may be substantially rectangular, and it may have rounded corners. The waveplate may be transparent to visible light and/or non-visible light, such as light in the wavelength range of 100 nm to 1 mm, such as light in the wavelength range of 350 nm to 1400 nm. Preferably, the waveplate is transparent to light emitted from the first and/or the second light source.

In preferred embodiments, the waveplate is a quarter-wave plate (QW plate). The waveplate may comprise a glass plate and a quartz film attached to each other. Preferably, the quartz film is very thin, e.g. when compared to the entire thickness of the waveplate. The thickness of the quartz film is preferably selected such that it corresponds to a true zero-order quarter wave film (QW film). This has the advantage that the QW plate works for a large range of angles and wavelengths. In some embodiments, the thickness of the quartz film is between 5 μm to 25 μm, preferably between 10 μm to 20 μm, even more preferably between 12 μm to 18 μm, such as approximately 15 μm. The QW film is preferably designed for the center wavelengths of green Bayer pattern pixels since the green pixels are typically used for recreating the geometry of the scanned object. Ideally, the QW plate should be optimized for the incoming angle. In order to achieve this, it requires the quartz crystal to be cut in a custom direction, to fit the optical properties of the system. However, the negative impact of using a standard crystal direction is minor.

Alternatively, the quarter-wave plate may be a glass plate with an attached polarizing polymer film. The film may be attached by an adhesive such as glue. However, a quarter-wave plate based on a glass plate and a thin quartz film is preferred, since it has an overall better optical performance compared to the QW plate having a polymer QW film. At least one advantage of using a QW plate comprising a glass plate and a quartz film is that the phase shift of light being transmitted through the QW plate is closer to the ideal $\lambda/4$ for a wider wavelength range of the light and for greater angles of incident light. Another advantage is that the wavefront distortion of the transmitted light is significantly lower compared to the polymer QW film. A lower wavefront distortion is desirable for geometry calibration and the accuracy of the scanning device. In other embodiments, the QW plate comprises one or more glass plates, such as two glass plates, wherein a thin quartz film is attached to one of the glass plates. In other embodiments, the QW plate comprises a layer of quartz and a layer of Magnesium fluoride ($MgF_2$). In other embodiments, the QW plate comprises a glass plate, a layer of quartz and a layer of Magnesium fluoride ($MgF_2$). The waveplate may have a total thickness of between 0.3 mm to 1.2 mm, such as between 0.5 mm to 1 mm. In some embodiments, the thickness of the waveplate is between 0.5 mm to 0.6 mm.

Reflecting Element

The scanning device may further comprise a reflecting element, such as a mirror or prism, configured to alter the direction of a beam of light incident on the reflecting element. The reflecting element may be located in a distal end of the probe or it may be located in a sleeve for being removably mounted over the probe. In preferred embodiments, both the waveplate and the reflecting element are positioned in the probe of the scanning device, such as in a distal end of the probe.

The reflecting element may be configured, e.g. angled inside the probe, to alter the direction of light projected by the imaging system of the scanning device. As an example, the reflecting element is preferably configured to change the direction of a center beam of light projected by the light projector from a direction substantially parallel to the longitudinal axis of the scanning device to a direction substantially orthogonal to said longitudinal axis. In preferred embodiments, the surface normal of the reflecting element defines an angle with respect to the longitudinal axis of approximately 40-50 degrees, preferably approximately 45 degrees.

Preferably, the waveplate is positioned such that projected light is reflected first by the reflecting element and then transmitted through the waveplate. An advantage hereof, is that it allows for a simpler design of the reflecting element, e.g. a mirror, since the reflecting element does not need to fulfill requirements for the relative phase between s- and p-polarization of the light. Preferably, the beam splitter is a polarizing beam splitter configured to output/transmit a beam of linearly polarized light. Thus, in preferred embodiments, the linearly polarized light travels through the imaging system and hits the reflecting element inside the probe before exiting through the waveplate. In such embodiments, there are less requirements to the design of the reflecting element, since only the linear polarization needs to be maintained by the reflecting element. Conversely, If the projected light is first transmitted through a waveplate and then incident on the reflecting element, said reflecting element is preferably configured to preserve the polarization state of incident light upon reflection. In other words, in such a scenario the reflecting element is preferably configured to maintain the circular polarization of the light. In the former case, when there are no requirements for maintaining circular polarization, a reflecting element having the same number of layers, can give higher and more homogenous reflection in terms of angles and wavelength.

The reflecting element may be shaped in a variety of ways. As an example, the reflecting element may be substantially rectangular. In some embodiments, the reflecting element comprises a plurality of corners, wherein at least some of the corners are rounded. The reflecting element may be a dielectric mirror-stack based on the principle of thin-film interference. The dielectric mirror-stack may comprise a plurality of layers, wherein each layer has a different refractive index, allowing each interface to produce a small amount of reflection. The thickness of the layers is preferably proportional to a chosen wavelength, such that the multiple reflections constructively interfere. As an example, the dielectric mirror-stack may comprise between 10 to 200 individual layers, such as between 50 to 100 individual layers.

Sleeve and Optical Window

The scanning device may further comprise a sleeve configured to be removably mounted over the probe. The sleeve is preferably configured to be able to withstand several cycles in an autoclave for sterilizing the sleeve. In preferred embodiments, the sleeve is able to withstand disinfection in an autoclave for at least 100 cycles, even more preferably for at least 150 cycles. The scanning device and/or the sleeve may comprise a locking mechanism, such as a mechanical or a magnetic locking mechanism, for holding the sleeve in place. The sleeve may comprise an outer shell. The shell may be manufactured in one piece. The sleeve may comprise an optical window.

The optical window may be transparent to visible light and/or non-visible light, such as light in the wavelength range of 100 nm to 1 mm, such as light in the wavelength range of 350 nm to 1400 nm. Preferably, the optical window is transparent to light emitted from the first and/or the second light source. The window may be located in the outer shell, such as in a distal end of the sleeve. The window may be substantially rectangular, and it may have rounded corners. Preferably, the scanning device and the sleeve are configured such that, when the sleeve is mounted to the scanning device, the optical window in the sleeve is substantially aligned with the waveplate in the probe. As an example, both the optical window and the waveplate may have a rectangular shape comprising four sides, wherein one or more of the sides are substantially parallel when the sleeve is mounted to the scanning device.

The optical window is preferably able to withstand reprocessing such as autoclaving, wiping with alcohol, washing with soft brush and soap etc. The optical window should preferably be able to withstand disinfection in an autoclave, preferably at least 100 cycles, even more preferably at least 150 cycles. In general, the autoclave process can cause coating(s) on the window to deteriorate, and many autoclaves will typically leave residue on the window which can be very hard to clean (e.g., metal oxides). Therefore, the optical window may be coated with a highly hydrophobic coating such as Perfluorodecyltrichlorosilane (FDTS). The coating causes droplets of condensed steam to roll of the surface, rather than drying, thereby minimizing deposits on the surface of the window.

The optical window is preferably able to be heated quickly, to avoid fogging. In embodiments, wherein the scanning device relies on polarized light, the window should preferably maintain the polarization state of light passing through the window. In preferred embodiments, the optical window is made of sapphire. Sapphire has a high heat transfer coefficient, allowing for significantly faster heating, when comparing to any amorphous glass material.

Preferably, the optical window is as thin as possible while still being sturdy during use, and for handling during fabrication and assembly. In some embodiments, the window has a thickness of between 0.3 mm to 0.7 mm, such as between 0.4 to 0.6 mm, such as approximately 0.5 mm. Preferably, the optical window is made of a material having a low birefringence, such that the optical window does not alter the polarization of the light. The material of the optical window may be selected from sapphire, borosilicate glass (BK7), acrylic glass (PMMA), or other materials. Preferably, the optical window is made of sapphire, wherein the window has a thickness of between 0.4 to 0.6 mm. This results in an optical window that preserves the polarization state to an acceptable tolerance, while still being sturdier than e.g. a 1 mm thick glass window.

The optical window may comprise one or more coatings, such as a two-layer coating, a three-layer coating, or a coating comprising more than three layers. As an example, the optical window may comprise an antireflective coating. Thus, the optical window may comprise a sapphire material with an antireflective coating. The antireflective coating of the window may comprise one or more materials selected from the group of: Magnesium fluoride ($MgF_2$), Cerium(III) fluoride ($CeF_3$), Lanthanum trifluoride ($LaF_3$), Neodymium (II) fluoride ($NdF_3$), Lead(II) fluoride ($PbF_2$), Ytterbium(III) fluoride ($YbF_3$), Yttrium(III) fluoride ($YF_3$), Silicon dioxide ($SiO_2$), Aluminium(III) oxide ($Al_2O_3$), Yttrium(III) oxide ($Y_2O_3$), Silicon monoxide (SiO), Hafnium(IV) oxide ($HfO_2$), Tantalum pentoxide ($Ta_2O_5$), Titanium dioxide ($TiO_2$), Zinc selenide (ZnSe), Zinc sulfide (ZnS), and/or combinations thereof. The antireflective coating may comprise one or more layers of different materials, such as a first layer made from an oxide mixture, and a second layer made from a fluoride.

In some embodiments, the window comprises a two-layer coating, wherein a first layer is made of tantalum pentoxide ($Ta_2O_5$) and a second layer is made of silicon dioxide ($SiO_2$). The second layer may be positioned as the outermost layer of the coating. In some embodiments, the window further comprises a second coating, such as a Perfluorodecyltrichlorosilane (FDTS) coating, permanently attached to the antireflective coating, such as attached to the $SiO_2$ layer of the two-layer coating on the window. An advantage of using silicon dioxide ($SiO_2$) as the outermost layer is that a coating such as Perfluorodecyltrichlorosilane (FDTS) readily forms covalent bonds to the surface of the $SiO_2$ layer.

Processor

The intraoral scanning device preferably further comprises one or more processors configured to process the two-dimensional (2D) images acquired by the scanning device. The processor(s) may be part of the scanning device, or they may be part of an external computing device. As an example, the one or more processors may comprise a field-programmable gate array (FPGA) and/or a processor employing a reduced instruction set computer (RISC) instruction set architecture (e.g. an ARM processor) located on the scanning device.

The scanning device is preferably configured to acquire and/or generate scan data, which may be transmitted to an external device, such as a computer. The scan data may comprise information relating to the three-dimensional dental object. The scan data may comprise any of: 2D images, processed 2D images, 3D point clouds, depth data, texture data, intensity data, color data, fluorescence data, infrared data, and/or combinations thereof. As an example, the scan data may comprise one or more point clouds, wherein each point cloud comprises a set of 3D points describing the three-dimensional dental object. As another example, the scan data may comprise images, each image comprising image data e.g. described by image coordinates and a timestamp (x, y, t), wherein depth information can be inferred from the timestamp.

The image sensor(s) of the scanning device may acquire a plurality of 2D images of a dental object in response to illuminating said object using the one or more light projectors. The plurality of 2D images may also be referred to herein as a stack of 2D images. The 2D images may subsequently be provided as input to the processor, which processes the 2D images to generate scan data. The processing of the 2D images may comprise the step of determining which part of each of the 2D images are in focus in order to deduce/generate depth information from the images. The depth information may be used to generate 3D point clouds comprising a set of 3D points in space, e.g., described by cartesian coordinates (x, y, z). In some embodiments, only a green part of the captured light, such as wavelengths from about 495 nm to about 570 nm, is used to generate the 3D points. In other embodiments, only a red part of the captured light, such as wavelengths from about 625 nm to about 750 nm, is used to generate the 3D points.

The 3D point clouds may be generated by the one or more processors or by another processing unit. Each 2D/3D point may furthermore comprise a timestamp that indicates when the 2D/3D point was recorded, i.e., from which image in the stack of 2D images the point originates. The timestamp is preferably correlated with the z-coordinate of the 3D points, i.e., the z-coordinate may be inferred from the timestamp. Accordingly, in some embodiments the output of the processor(s) is the scan data, and the scan data may comprise image data and/or depth data, e.g. described by image coordinates and a timestamp (x, y, t) or alternatively described as (x, y, z). The scanning device may be configured to transmit other types of data in addition to the scan data. Examples of data include 3D information, texture information such as infra-red (IR) images, near-infrared images (NIR), fluorescence images, reflectance color images, x-ray images, and/or combinations thereof.

Wireless Network Module

The dental scanning device preferably further comprises a wireless network module configured to wirelessly connect the scanning device to a wireless network, such as a wireless local area network (WLAN). The wireless network module may be a part of the scanning device, or it may be a part of an external unit close to the scanning device such as a pod for holding the scanning device. Preferably, the scanning device comprises the wireless network module.

The wireless network module is configured to wirelessly connect the scanning device to a wireless network. The wireless network module may include a chip that performs various functions required for the scanning device to wirelessly communicate with the network, i.e. with network elements that include wireless capability. The wireless network module may utilize one or more of the IEEE 802.11 Wi-Fi protocols/integrated TCP/IP protocol stack that allows the scanning device to access the network. The wireless network module may include a system-on-chip having different types of inbuilt network connectivity technologies. These may include one or more wireless protocols such as Bluetooth, ZigBee, Wi-Fi, WiGig (also known as 60 GHz Wi-Fi), 802.11ad (WI-FI), etc. The scanning device may further (or alternatively) be configured to transmit data using a wired connection, such as by using an ethernet cable or a USB cable. In preferred embodiments, the scanning device comprises a wireless network module configured to wirelessly transfer data, such as scan data, from the scanning device to an external computer system.

A network is to be understood herein as a digital interconnection of a plurality of network elements with the purpose of sending/receiving data between the network elements. The network elements may be connected using wires, optical fibers, and/or wireless radio-frequency methods that may be arranged in a variety of network topologies. Such networks may include any of Personal Area Network (PAN), Local Area Network (LAN). Wireless LAN, Wide Area Network (WAN), or other network types. One or more of the network elements may have access to the internet and network elements may also include a server such as a cloud server. The network elements may include a plurality of components like printers, processing units, displays, modems, routers, computers, servers, storage mediums, identification network elements, etc. As disclosed earlier, these network elements may be connected using one or more of wires, optical fibers or wirelessly, so that at least some of these elements may communicate with one another and directly or indirectly with the scanning device. The scanning device is preferably configured to communicate, using the wireless network module, with at least one other network element via the wireless network.

DETAILED DESCRIPTION OF THE DRAWINGS

FIG. 1 shows an embodiment of a scanning device 1 according to the present disclosure. In this embodiment, the scanning device comprises a light source or a light projector 4, a beam splitter 3, and a focus lens 6. The focus lens 6 is configured to shift the focal plane 8 of the light projected on the scanned object. As an example, the focus lens 6 may be configured to translate back and forth between two vertical lines, 9 and 10. According to this embodiment, the scanning device further comprises a reflecting element 7 such as a mirror. The reflecting element 7 may be configured to change the direction of the projected light, e.g. from a direction substantially parallel to the longitudinal axis of the scanning device to a direction substantially orthogonal to said axis. This may aid the projected light to be directed towards one or more objects inside the oral cavity, such as teeth and gingiva. The scanning device may further comprise one or more additional optical components 5, such as collimation lenses or focus lenses. A front glass element 5 may be located before the reflective element 7. This embodiment may further comprise the light absorbing unit as disclosed herein.

Figure 2:
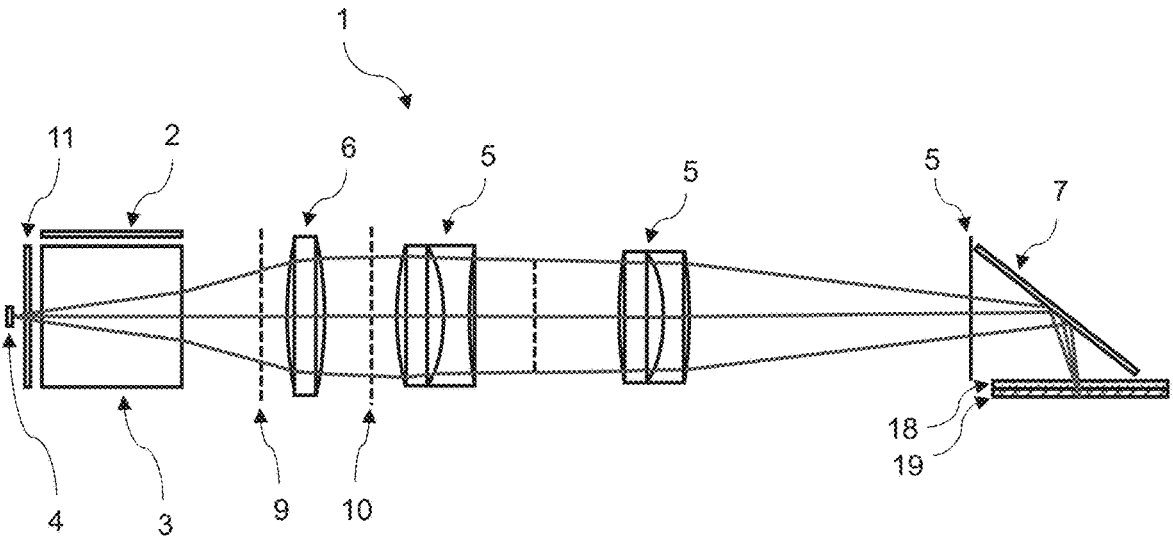
FIG. 2 shows another embodiment of a scanning device according to the present disclosure.

FIG. 2 shows an embodiment of a scanning device 1 according to the present disclosure. In this embodiment, the scanning device further comprises a waveplate 18, such as a quarter-wave plate, and an optical window 19. The optical window 19 may be located in a sleeve configured to be removably mounted to the scanning device. In this example, the mask 11 for patterning the light into a predefined pattern, and the image sensor 2 configured to acquire one or more images are shown. These two components may also form part of the embodiment shown in FIG. 1. Some projected light rays are further displayed on the drawing for illustrative purposes. In some embodiments, the one or more additional optical components 5 comprises a front glass. The front glass may be placed in a cylinder/tube. The front glass may have an elliptically shaped circumference. Preferably, the front glass is aligned actively to achieve the best polarization. This embodiment may further comprise the light absorbing unit as disclosed herein.

FIG. 3 shows an example of an arrangement of some components configured to form part of the scanning device 1 according to the present disclosure. In this example, the scanning device comprises a first light source 4 for emitting light, a mask 11 for patterning the light into a predefined pattern, a beam splitter 3 configured to split an incident beam of light into two beams, an image sensor 2 configured to acquire one or more images, and a light absorbing unit 13 configured to absorb light reflected or transmitted by the beam splitter 3. In preferred embodiments, the light absorbing unit 13 comprises an antireflective coating 14 arranged on a surface of the beam splitter 3, and an absorbing layer 15 configured to absorb light. The reflection of visible light of the antireflective coating is preferably below 5%. The antireflective coating 14 is preferably arranged between the beam splitter 3 and the absorbing layer 15, such that light transmitted through the antireflective coating is transmitted into the absorbing layer. The purpose of the light absorbing unit 13 is to minimize stray light, i.e. undesired light, on the image sensor 2. In this arrangement, light absorbing unit 13 is positioned opposite the image sensor 2. The scanning device may comprise additional optical elements, such as lenses, mirrors, optical filters, waveplates, and/or combinations thereof (not shown in this figure).

FIG. 4 shows another example of an arrangement of some components configured to form part of the scanning device 1 according to the present disclosure. In this embodiment, the scanning device further comprises a second light source 16 configured to emit light at a second wavelength and a long pass filter 17 arranged in front of the image sensor 2. The long pass filter 17 may be arranged on a surface of the beam splitter. i.e. the long pass filter 17 may be integrated in the beam splitter 3. In preferred embodiments, the second wavelength is selected from the range of 380 nm to 485 nm, such as from the range of 395 nm to 415 nm. The long pass filter 17 is preferably configured to block light of the second wavelength, since this wavelength is typically used as an excitation wavelength. Therefore the long pass filter 17 may be configured to at least block light of the second wavelength, or block light below the second wavelength, or transmit light having wavelengths above the second wavelength. The mask 11 is preferably configured to block light emitted by the first light source in predefined areas, such that said light is patterned into a predefined pattern. Accordingly, the mask 11 may comprise a masking material having a low transmission of light emitted by the first light source 4. Furthermore, the masking material may be configured to allow a high transmission of the second wavelength emitted by the second light source 16. In other words, the masking material may comprise or constitute an optical short pass filter configured to have a high transmission of the second wavelength.

FIG. 5 shows another example of an arrangement of some components configured to form part of the scanning device 1 according to the present disclosure. In this example, the scanning device comprises a first light source 4 for emitting light, a mask 11 for patterning the light into a predefined pattern, a beam splitter 3 configured to split an incident beam of light into two beams, an image sensor 2 configured to acquire one or more images, and a light absorbing unit 13 configured to absorb light reflected or transmitted by the beam splitter 3. In preferred embodiments, the light absorbing unit 13 comprises an antireflective coating 14 arranged on a surface of the beam splitter 3, and an absorbing layer 15 configured to absorb light. The reflection of visible light of the antireflective coating is preferably below 5%. The antireflective coating 14 is preferably arranged between the beam splitter 3 and the absorbing layer 15, such that light transmitted through the antireflective coating is transmitted into the absorbing layer. The purpose of the light absorbing unit 13 is to minimize stray light, i.e. undesired light, on the image sensor 2. In this arrangement, the light absorbing unit 13 is positioned opposite the mask 11. The scanning device may comprise additional optical elements, such as lenses, mirrors, optical filters, waveplates, and/or combinations thereof (not shown in this figure).

FIG. 6 shows another example of an arrangement of some components configured to form part of the scanning device 1 according to the present disclosure. In this embodiment, the arrangement of the optical components is different. In some embodiments, the light source(s) (4, 16) are arranged to project light in a forward direction, i.e. towards the distal end of the scanning device as shown in figure C. In such embodiments, the beam splitter 3 is configured to transmit the light from said light source(s) through the interface 12 and further configured to polarize the incident light to a linear polarization. In other embodiments, the light source(s) (4, 16) are arranged to project light in a downward direction, i.e. substantially orthogonal to the longitudinal axis of the scanning device, as shown in this figure. In such embodiments, the beam splitter 3 is configured to reflect the incident light from the light source(s) (4, 16) at the interface 12, such that the projected light is directed towards the distal end of the scanning device (corresponding to the right in this figure). In such embodiments, the light absorbing unit 13 is positioned opposite the mask 11.

Figure 7A:
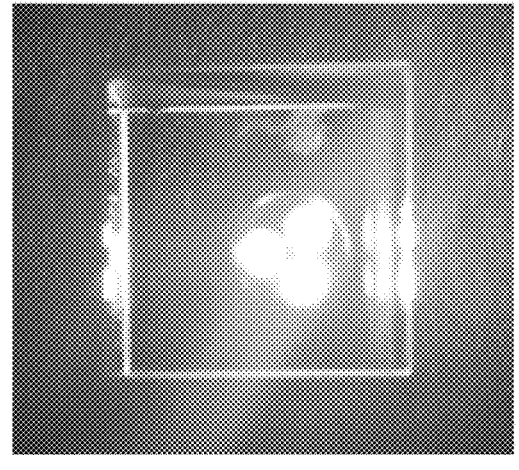
FIG. 7A-7B shows two images of white light transmitted through a long pass filter with a certain cut-off wavelength.
Figure 7B:
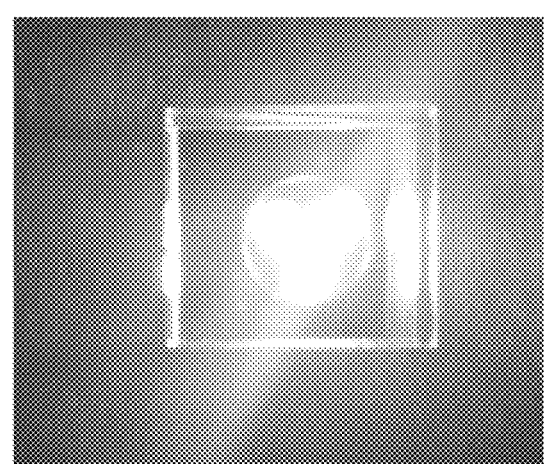

FIG. 7A-7B shows two images of white light transmitted through a long pass filter with a certain cut-off wavelength. In the image to the left (FIG. 7A), the long pass filter has a cut-off wavelength of 450 nm, whereas in the image to the right (FIG. 7B), the long pass filter has a cut-off wavelength of 435 nm. Using a long pass filter with a lower cut-off wavelength allows more blue light to reach the image sensor, whereby colors can be better recreated; i.e. a broader spectrum of white light allows for a higher color fidelity. In preferred embodiments, the scanning devices comprises a polarizing beam splitter having a high lead oxide content in order to enable a good ultraviolet (UV) transmission through the beam splitter. Furthermore, the scanning device preferably comprises a long pass filter with a cut-off wavelength of 435 nm or lower. The long pass filter is preferably integrated in the beam splitter, e.g. it may be arranged on a surface of the beam splitter. Preferably, the beam splitter is oriented such that the long pass filter is facing the image sensor.

Figure 8A:
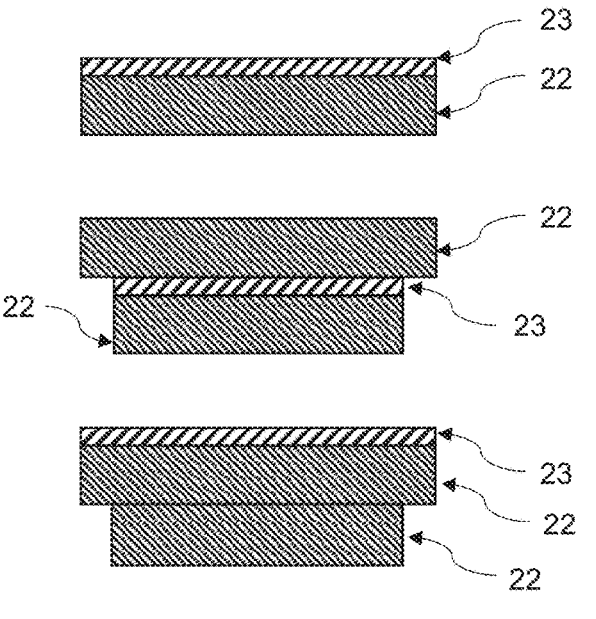
FIG. 8A-8B shows some different embodiments of a quarter-wave plate. In one embodiment, the quarter-wave plate comprises a glass plate and a thin quartz film.
Figure 8B:
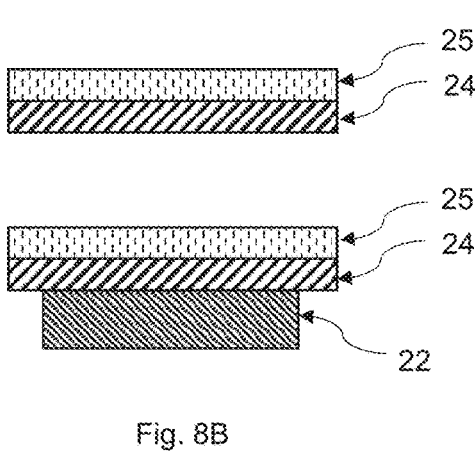

FIG. 8A-8B shows some different embodiments of a quarter-wave plate (QW plate). In one embodiment, the QW plate comprises a glass plate 22 and a thin quartz film 23. In another embodiment, the QW plate comprises two glass plates 22, wherein a thin quartz film 23 is sandwiched between the two glass plates 22. In yet another embodiment, the OW plate comprises two glass plates 22 attached to each other, wherein a thin quartz film 23 is attached to one of the glass plates 22. The quartz film's thickness is preferably selected such that the film 23 corresponds to a true zero-order QW film, which has the advantage that the OW plate works for a large range of angles and wavelengths. As an example, the thickness of the quartz film 23 may be selected from the range of 10 µm to 20 µm, such as from 14 µm to 16 µm, such as approximately 15 µm. In yet another embodiment, the QW plate comprises a layer of quartz 24 and a layer of magnesium fluoride (MgF$_2$) 25 (FIG. 8B). In yet another embodiment, the QW plate comprises a glass plate 22 with a quartz film 24 on top, and a layer of magnesium fluoride (MgF$_2$) 25 on the outside of the quartz film 24 (FIG. 8B). In yet another embodiment, the QW plate comprises a glass plate 22 with a polarizing polymer film attached (not shown).

Figure 9:
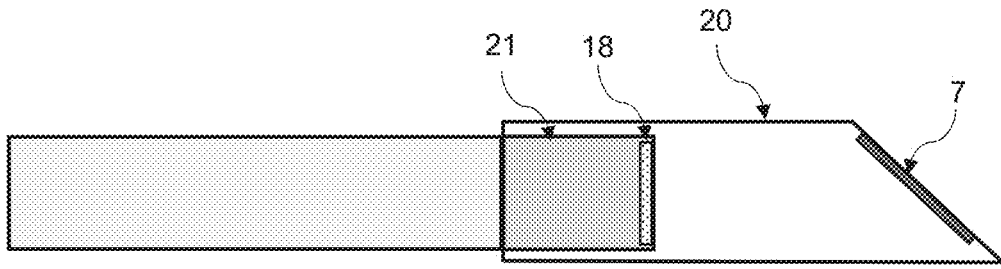
FIG. 9 shows a schematic of a scanning device comprising a sleeve configured to be removably placed over a probe of the scanning device, wherein the sleeve comprises a reflecting element.

FIG. 9 shows a schematic of a scanning device comprising a sleeve 20 configured to be removably placed over a probe 21 of the scanning device, wherein the sleeve comprises a mirror 7. In this embodiment, the scanning device further comprises a quarter-wave plate (QW plate) 18, wherein the QW plate 18 is placed in the probe 21 of the scanning device. In this embodiment, the QW plate is placed in the optical path before the light is projected onto the mirror 7 in the sleeve 20. In this embodiment, the mirror preferably preserves the polarization state of pure s- or p-polarized incident light upon reflection. In this embodiment, the QW plate is substantially orthogonal to the longitudinal axis of the scanning device. This embodiment may further comprise the light absorbing unit as disclosed herein.

Figure 10:
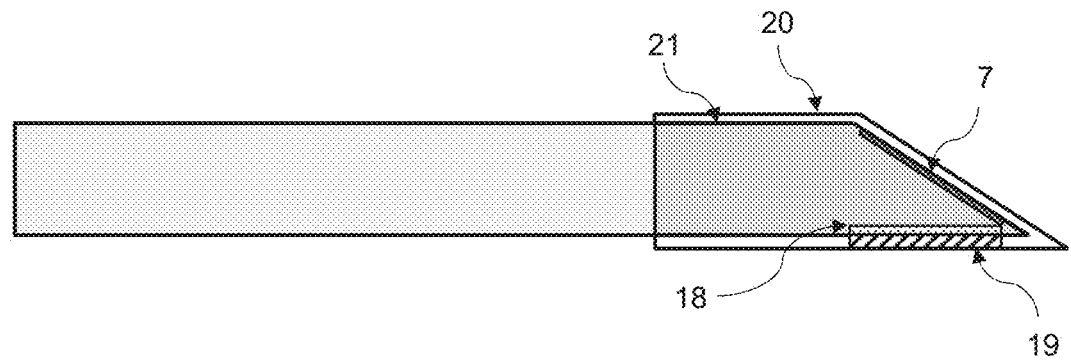
FIG. 10 shows a schematic of a scanning device comprising a sleeve configured to be removably placed over a probe of the scanning device, wherein the sleeve comprises an optical window.

FIG. 10 shows a schematic of a scanning device comprising a sleeve 20 configured to be removably placed over a probe 21 of the scanning device, wherein the sleeve 20 comprises an optical window 19. In this embodiment, the scanning device further comprises a quarter-wave plate (OW plate) 18, wherein the OW plate 18 is placed in the probe 21 of the scanning device. In this embodiment, the QW plate is placed in the optical path after the projected light has been reflected by the mirror 7. Accordingly, the waveplate 18 is positioned such that the projected light is reflected first by the reflecting element and then transmitted through the waveplate. An advantage hereof, is that this position of the QW plate allows for a simpler design of the mirror 7, since the mirror does not need to fulfill requirements for the relative phase between s- and p-polarization of the light. In this embodiment, both the mirror and the OW plate is located in the probe of the scanning device. Preferably, the QW plate 18 is aligned with the optical window 19, when the sleeve 20 is mounted to the scanning device. In this embodiment, the QW plate is substantially parallel to the longitudinal axis of the scanning device. This embodiment may further comprise the light absorbing unit as disclosed herein.

Figure 11:
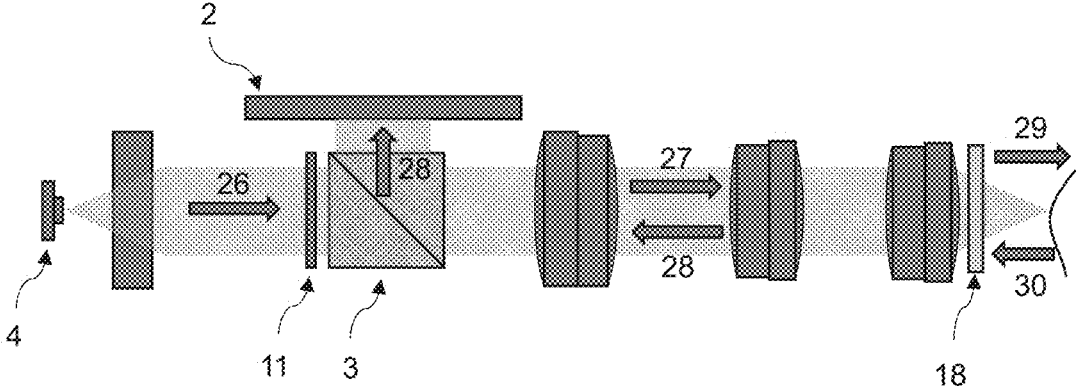
FIG. 11 shows an embodiment of a scanning device according to the present disclosure.

FIG. 11 shows a schematic of an embodiment of a scanning device according to the present disclosure. In this example, unpolarized light 26 from a light source 4, such as an LED, is transmitted through a beam splitter 3, such as a polarizing cube. The beam splitter 3 transmits only the linearly polarized part 27 of the light (of a certain orientation. e.g. vertical), which travels through the optical system (e.g. various collimation lenses and/or focus lenses). When the linearly polarized light 27 is transmitted through the quarter-wave plate 18 (OW plate), it is converted into circularly polarized light 29. The light is then reflected off the surface of the scanned object, such as a tooth, wherein the circularly polarization is maintained but the rotation is reversed (e.g. from right-handed to left-handed or vice versa). When the reflected light 30 travels through the QW plate 18 again, it is converted back into linearly polarized light 28 of another orientation than the projected light inside the scanning device (e.g. vertical 27 versus horizontal 28 linear polarization). Thus, when the linearly polarized 28 light interacts with the beam splitter 3 after having travelled back through the imaging system, the beam splitter reflects the light onto the image sensor 2. This embodiment may further comprise the light absorbing unit as disclosed herein.

FURTHER DETAILS OF THE INVENTION

1. An intraoral scanning device for acquiring images inside the oral cavity of a subject, wherein the intraoral scanning device comprises:
   a first light source for emitting light;
   a mask for patterning the light into a predefined pattern;
   a beam splitter configured to split an incident beam of light into two beams, wherein one of said beams is linearly polarized;
   a light absorbing unit configured to absorb light reflected or transmitted by the beam splitter, and
   an image sensor configured to acquire one or more images.
2. The scanning device according to item 1, wherein the light absorbing unit comprises an antireflective coating.
3. The scanning device according to any of the preceding items, wherein the reflection of visible light of the antireflective coating is below 5%.
4. The scanning device according to any of the preceding items, wherein the reflection of visible light of the antireflective coating is below 2%.
5. The scanning device according to any of the preceding items, wherein the reflection of visible light of the antireflective coating is below 1%.
6. The scanning device according to any of the preceding items, wherein the antireflective coating comprises three layers of different material.
7. The scanning device according to any of the preceding items, wherein the antireflective coating comprises one or more materials selected from the group of: tantalum pentoxide (Ta$_2$O$_5$), silicon dioxide (SiO$_2$), and magnesium fluoride (MgF$_2$).
8. The scanning device according to any of the preceding items, wherein the antireflective coating comprises a layer of tantalum pentoxide (Ta$_2$O$_5$), a layer of silicon dioxide (SiO$_2$), and a layer of magnesium fluoride (MgF$_2$).
9. The scanning device according to any of the preceding items, wherein the light absorbing unit further comprises an absorbing layer.
10. The scanning device according to item 9, wherein the absorbing layer is made of a glass material having substantially the same refractive index as the beam splitter.
11. The scanning device according to any of the items 9-10, wherein the absorbing layer is attached to the beam splitter via a layer of optical cement having substantially the same refractive index as the beam splitter.

12. The scanning device according to any of the items 9-11, wherein the absorbing layer comprises an added material, such as carbon.

13. The scanning device according to item 9, wherein the absorbing layer comprises a material selected from the group of black lacquer, carbon, aluminum (Al), silver (Ag), chromium (Cr), colored glass, an opaque material, and/or combinations thereof.

14. The scanning device according to item 9, wherein the absorbing layer is a metal layer.

15. The scanning device according to any of the items 9-14, wherein the absorbing layer has an absorbance of 2 OD or higher, corresponding to a transmission through the absorbing layer of 1% or less.

16. The scanning device according to any of the items 9-15, wherein the absorbing layer has an absorbance of 3 OD or higher, corresponding to a transmission through the absorbing layer of 0.1% or less.

17. The scanning device according to any of the preceding items, wherein the beam splitter is a polarizing beam splitter.

18. The scanning device according to any of the preceding items, wherein the beam splitter is a polarizing beam splitter cube.

19. The scanning device according to any of the preceding items, wherein the image sensor and the light absorbing unit are located on opposite sides of the beam splitter.

20. The scanning device according to any of the preceding items, wherein the image sensor and the light absorbing unit are located on opposite sides of the beam splitter, such that ideally no stray light is present on the image sensor.

21. The scanning device according to any of the preceding items, wherein the light absorbing unit comprises an antireflective coating and an absorbing layer, wherein the antireflective coating is placed between the beam splitter and the absorbing layer.

22. The scanning device according to any of the preceding items, wherein the beam splitter is a beam-splitting polarizer configured to split an incident beam of light into two beams, wherein one of said beams is linearly polarized.

23. The scanning device according to any of the preceding items, wherein the beam splitter is a beam-splitting polarizer configured to alter the polarization state of light travelling through beam-splitting polarizer.

24. The scanning device according to item 22 or 23, wherein the beam-splitting polarizer is configured such that light exiting the beam-splitting polarizer is linearly polarized.

25. The scanning device according to any of the preceding items, wherein the scanning device further comprises a waveplate configured to after the polarization state of light travelling through the waveplate.

26. The scanning device according to any of the preceding items, wherein the waveplate is a quarter-wave plate configured to convert linearly polarized light into circularly polarized light and vice versa.

27. The scanning device according to any of the preceding items, wherein the intraoral scanning device further comprises a long pass filter in front of the image sensor.

28. The scanning device according to item 27, wherein the long pass filter is configured to block wavelengths below 405 nm and/or transmit wavelengths above or equal to 405 nm.

29. The scanning device according to item 27, wherein the long pass filter is configured to transmit wavelengths above 435 nm.

30. The scanning device according to any of the preceding items, wherein the first light source is configured to emit white light.

31. The scanning device according to any of the preceding items, wherein the first light source is configured to emit non-collimated light.

32. The scanning device according to any of the preceding items, wherein the first light source is a multichromatic light source.

33. The scanning device according to any of the preceding items, wherein the intraoral scanning device further comprises a second light source configured to emit light at a second wavelength.

34. The scanning device according to item 32, wherein the second wavelength is selected from the range of 380 nm to 485 nm.

35. The scanning device according to item 32, wherein the second wavelength is selected from the range of 395 nm to 415 nm.

36. The scanning device according to any of the items 32-35, wherein the antireflective coating is configured to transmit the second wavelength.

37. The scanning device according to any of the items 32-36, wherein the second wavelength is suitable for exciting a material, such as bacteria, inside the oral cavity of the subject.

38. The scanning device according to any of the preceding items, wherein the intraoral scanning device is configured to acquire data based on a fluorescent signal received from the material.

39. The scanning device according to any of the preceding items, wherein the mask comprises a masking material configured to have a low transmission of light emitted by the first light source, such that said light is patterned into a predefined pattern.

40. The scanning device according to any of the preceding items, wherein the masking material comprises an optical short pass filter configured to have a high transmission of the second wavelength.

41. The scanning device according to item 40, wherein the optical short pass filter is a dielectric low pass filter coating.

42. The scanning device according to any of the preceding items, wherein the beam splitter is configured to reflect a fluorescence signal onto the image sensor, wherein said signal is received from a dental object within the oral cavity of the subject.

43. The scanning device according to any of the preceding items, wherein the intraoral scanning device is a focus scanning device configured to shift a focal plane of light projected by the scanning device.

44. The scanning device according to any of the preceding items, wherein the intraoral scanning device further comprises a focus lens configured to, during operation, translate back and forth along a predefined distance.

45. The scanning device according to item 44, wherein the predefined distance is between 1 mm and 5 mm.

46. The scanning device according to item 44 or 45, wherein the intraoral scanning device further comprises a magnetic encoder configured to determine a position of the focus lens.

47. The scanning device according to any of the preceding items, wherein the first light source is configured to emit non-collimated light.

48. The scanning device according to any of the preceding items, wherein the intraoral scanning device further comprises a probe located in a distal end of the scanning device.

49. The scanning device according to any of the preceding items, wherein the intraoral scanning device comprises a reflecting element, such as a mirror, located in the probe.

50. The scanning device according to any of the preceding items, wherein the waveplate is a quarter-wave plate configured to convert linearly polarized light into circularly polarized light.

51. The scanning device according to any of the preceding items, wherein the waveplate, e.g. the quarter-wave plate, is located in the probe.

52. The scanning device according to any of the preceding items, wherein the intraoral scanning device further comprises a sleeve which is configured to be removably mounted to the scanning device.

53. The scanning device according to item 52, wherein the sleeve comprises an optical window configured to transmit light from the first light source and/or from the second light source.

54. The scanning device according to item 53, wherein the optical window is configured to maintain the polarization state of light passing through the window.

55. The scanning device according to item 53 or 54, wherein the optical window is made of sapphire.

56. The scanning device according to any of the items 53-55, wherein the optical window has a thickness of between 0.3 mm to 1 mm.

57. The scanning device according to any of the items 53-56, wherein the optical window comprises a coating, the coating comprising a layer of tantalum pentoxide ($Ta_2O_5$) and a layer of silicon dioxide ($SiO_2$).

58. The scanning device according to any of the items 53-57, wherein, when the sleeve is mounted to the scanning device, the optical window of the sleeve is aligned with the quarter-wave plate in the probe.

59. The scanning device according to any of the items 53-5857, wherein the optical window and/or the quarter-wave plate are rectangular.

60. The scanning device according to any of the preceding items, wherein the quarter-wave plate comprises one or more layers of glass and a layer of quartz.

61. The scanning device according to any of the preceding items, wherein the quarter-wave plate comprises a layer of quartz and a layer of magnesium fluoride ($MgF_2$).

62. The scanning device according to any of the preceding items, wherein the quarter-wave plate comprises a layer of glass, a layer of quartz, and a layer of magnesium fluoride ($MgF_2$).

63. The scanning device according to any of the preceding items, wherein the quarter-wave plate comprises a coating, the coating comprising a layer of tantalum pentoxide ($Ta_2O_5$) and a layer of silicon dioxide ($SiO_2$).

64. The scanning device according to any of the preceding items, wherein one or more of the optical elements of the intraoral scanning device are configured to be transparent to light of the second wavelength, such as transparent to light with a wavelength of 405 nm.

65. The scanning device according to item 64, wherein said optical elements are selected from the group of: the mask, the beam-splitting polarizer, the antireflective coating, the quarter-wave plate, the window.

66. The scanning device according to item 64, wherein all of the optical elements of the intraoral scanning device are configured to be transparent to light of the second wavelength, such as transparent to light with a wavelength of 405 nm.

67. The scanning device according to any of the preceding items, wherein the predefined pattern is a checkerboard pattern.

68. The scanning device according to any of the preceding items, wherein the scanning device further comprises an infrared (IR) light source configured to emit infrared light.

69. The scanning device according to any of the preceding items, wherein the scanning device further comprises a near-infrared (NIR) light source configured to emit near-infrared light.

70. The scanning device according to item 68 or 69, wherein the wavelength of the infrared light is between 700 nm to 1 mm, such as between 700 nm to 1.4 μm.

71. The scanning device according to any of the preceding items, wherein the scanning device is configured to process acquired 2D images to generate a 3D representation of the scanned object.

72. The scanning device according to item 71, wherein the scanning device is configured to generate the 3D representation based on a selected wavelength range of a light spectrum provided by a multichromatic light source.

73. The scanning device according to item 72, wherein the selected wavelength range is 500-565 nm.

74. The scanning device according to item 72, wherein the selected wavelength range is 625-750 nm.

75. The scanning device according to any of the preceding items, wherein the scanning device comprises a processor configured to process a plurality of 2D images to generate processed data, wherein depth information can be inferred from the processed data.

76. The scanning device according to any of the preceding items, wherein the scanning device is a wireless scanning device configured to wirelessly transmit data to an external device.

77. The scanning device according to any of the preceding items, wherein the intraoral scanning device is a device for confocal scanning.

78. The scanning device according to any of the preceding items, wherein the scanning device is a handheld device.

79. An optical imaging system for an intraoral scanner, the imaging system comprising:
a light source for emitting light;
a mask for patterning the light into a predefined pattern;
a beam-splitting polarizer configured to split an incident beam of light into two beams, wherein one of said beams is linearly polarized, wherein the beam-splitting polarizer comprises an antireflective coating configured to absorb light of a predefined polarization and/or within a predefined range of wavelengths;
a quarter-wave plate (QWP) for converting linearly polarized light into circularly polarized light and vice versa; and an image sensor configured to acquire one or more images.

80. An optical imaging system for an intraoral scanner, the imaging system comprising:
  a white light source for emitting white light;
  a blue light source for emitting light of a predefined wavelength selected from the range of 380 nm to 485 nm;
  a mask for patterning the white light into a predefined pattern;
  a beam-splitting polarizer configured to split an incident beam of light into two beams, wherein one of said beams is linearly polarized, wherein the beam-splitting polarizer comprises an antireflective coating configured to absorb light of a predefined polarization and/or within a predefined range of wavelengths;
  a quarter-wave plate (QWP) for converting linearly polarized light into circularly polarized light and vice versa; and
  an image sensor configured to acquire one or more images.

81. An optical imaging system for an intraoral scanner, the imaging system comprising:
  one or more light sources for emitting light;
  a mask for patterning light emitted by one or more of the light source(s);
  a beam-splitting polarizer for splitting an incident beam of light into two beams, wherein one of said beams is linearly polarized, and wherein the beam-splitting polarizer comprises an antireflective coating for absorbing stray light; and
  an image sensor for acquiring one or more images.

82. An optical imaging system for an intraoral scanner, the imaging system comprising:
  a white light source for emitting white light;
  a mask for patterning the white light;
  a beam-splitting polarizer for splitting an incident beam of white light into two beams, wherein one of said beams is linearly polarized, and wherein the beam-splitting polarizer comprises an antireflective coating for absorbing stray light; and
  an image sensor for acquiring one or more images.

83. The optical imaging system according to any of the items 79-82, wherein the optical imaging system further comprises a window, wherein the window comprises a quarter-wave plate (QWP) for converting linearly polarized light into circularly polarized light and vice versa.

84. The optical imaging system according to any of the items 79-83, wherein the beam-splitting polarizer further comprises a long pass filter configured to transmit light at wavelengths above a predefined wavelength, such as 405 nm.

85. The optical imaging system according to any of the items 79-84, wherein the beam-splitting polarizer further comprises a long pass filter configured to transmit light at wavelengths above a predefined wavelength, such as 435 nm.

86. The optical imaging system according to any of the items 79-85, wherein the mask is a glass plate which is patterned, wherein the mask comprises an optical short pass filter arranged in a predefined pattern.

87. An intraoral scanning device for acquiring images inside the oral cavity of a subject, wherein the intraoral scanning device comprises an optical imaging system according to any of the items 79-86.

88. An optical system for an intraoral scanning device, the optical system comprising:
  a beam splitter comprising a first surface and a second surface.

89. The optical system according to item 88, wherein the optical system further comprises a light source for emitting light.

90. The optical system according to item 89, wherein the light source is a multichromatic light source.

91. The optical system according to any of the items 88-90, wherein the optical system further comprises a mask for patterning light, such as light from the first light source, into a predefined pattern 92. The optical system according to any of the items 88-91, wherein the beam splitter is configured to split an incident beam of light into two beams, wherein at least one of said beams is linearly polarized.

93. The optical system according to any of the items 88-92, wherein the beam splitter is a polarizing beam splitter.

94. The optical system according to any of the items 88-93, wherein the beam splitter is made of a material having a refractive index higher than 1.6.

95. The optical system according to any of the items 88-94, wherein the beam splitter is made of a material having a refractive index higher than 1.8.

96. The optical system according to any of the items 88-95, wherein the beam splitter is be made from a lead-based industrial glass such as lead(II) oxide.

97. The optical system according to any of the items 88-96, wherein the beam splitter is made from two glass prisms attached together to form an interface.

98. The optical system according to item 97, wherein the beam splitter further comprises a coating on the interface, wherein the coating is configured to separate unpolarized light into two different polarizations, whereby light of a first polarization state is transmitted through the interface and light of a second polarization state is reflected at the interface.

99. The optical system according to any of the items 88-98, wherein the beam splitter further comprises a long pass filter having a predefined cut-off wavelength, such that wavelengths below said cut-off wavelength are blocked by the filter, wherein the long pass filter is arranged on the first surface of the beam splitter.

100. The optical system according to item 99, wherein the long pass filter is bonded to the beam splitter to form a single unit.

101. The optical system according to any of the items 88-100, wherein the beam splitter further comprises a light absorbing unit comprising an absorbing layer for absorbing light, wherein the light absorbing unit is arranged on the second surface of the beam splitter.

102. The optical system according to item 101, wherein the light absorbing unit is bonded to the beam splitter to form a single unit.

103. The optical system according to any of the items 88-102, wherein the optical system further comprises a quarter-wave plate for converting linearly polarized light into circularly polarized light and vice versa.

104. The optical system according to any of the items 88-103, wherein the optical system further comprises an image sensor configured to acquire one or more images, and wherein the beam splitter is arranged such that the first surface faces the image sensor.

105. The optical system according to any of the items 88-104, wherein the optical system further comprises a polarizing film attached to the image sensor, wherein the polarizing film is configured to transmit only a certain orientation of linearly polarized light onto the image sensor.

106. The optical system according to any of the items 88-105, wherein the first and second surfaces are opposite surfaces of the beam splitter.

107. The optical system according to any of the items 88-105, wherein the first and second surfaces are adjacent surfaces of the beam splitter.

108. The optical system according to any of the items 101-107, wherein the light absorbing unit comprises an antireflective coating.

109. The optical system according to item 108, wherein the reflection of visible light of the antireflective coating is below 5%.

110. The optical system according to item 108, wherein the reflection of visible light of the antireflective coating is below 2%.

111. The optical system according to any of the items 108-110, wherein the antireflective coating comprises at least two layers of different material.

112. The optical system according to any of the items 108-111, wherein a first layer of the antireflective coating is made of a material having a refractive index from about 1.4 to about 1.6, and wherein a second layer of the antireflective coating is made of a material having a refractive index from about 1.6 to about 1.8.

113. The optical system according to any of the items 108-112, wherein the antireflective coating comprises alternating layers of different refractive index, wherein the layer thicknesses are selected to produce destructive interference in beams reflected from the interfaces of the layers, and constructive interference in the corresponding transmitted beams.

114. The optical system according to any of the items 108-113, wherein the antireflective coating is arranged between the beam splitter and the absorbing layer, such that light transmitted through the antireflective coating is transmitted into the absorbing layer.

115. The optical system according to any of the items 101-114, wherein the absorbing layer has an absorbance of 3 OD or higher, corresponding to a transmission through the absorbing layer of 0.1% or less.

116. The optical system according to any of the items 101-115, wherein the absorbing layer is made of an absorbing glass having substantially the same refractive index as the beam splitter.

117. The optical system according to any of the items 101-116, wherein the absorbing layer is attached to the beam splitter via a layer of optical cement having substantially the same refractive index as the beam splitter.

118. The optical system according to any of the items 98-117, wherein the first and second polarization states are linear polarization states that are perpendicular to each other.

119. The optical system according to any of the items 99-118, wherein the predefined cut-off wavelength of the long pass filter is 450 nm or lower.

120. The optical system according to any of the items 99-118, wherein the predefined cut-off wavelength of the long pass filter is 435 nm or lower.

121. The optical system according to any of the items 88-120, wherein the optical system further comprises a second light source configured to emit light at a second wavelength, wherein the second wavelength is selected from the range of 380 nm to 485 nm.

122. The optical system according to any of the items 88-121, wherein the second wavelength is selected from the range of 395 nm to 415 nm.

123. The optical system according to any of the items 88-122, wherein one or more optical elements of the optical system are configured to be transparent to light of the second wavelength.

124. The optical system according to item 123, wherein said optical elements include: the mask, the beam splitter, the antireflective coating(s), the quarter-wave plate, and the optical window.

125. The optical system according to any of the items 88-124, wherein a plurality of optical elements of the intraoral scanning device are configured to be transparent to light of the second wavelength, wherein said optical elements include one or more of: a mask, a beam splitter, antireflective coating(s), a waveplate, and an optical window.

126. The optical system according to any of the items 88-125, wherein the mask comprises a masking material configured to have a low transmission of light emitted by the multichromatic light source, such that said light is patterned into a predefined pattern, and wherein the masking material is further configured to have a high transmission of the second wavelength.

127. An intraoral scanning device comprising the optical system according to any of the items 88-126.

128. The intraoral scanning device according to item 127, wherein the intraoral scanning device is a device for confocal scanning.

While various exemplary embodiments of the disclosed system have been described above it should be understood that they have been presented for purposes of example only, not limitations. It is not exhaustive and does not limit the disclosure to the precise form disclosed.

Modifications and variations are possible in light of the above teachings or may be acquired from practicing the disclosure, without departing from the breadth or scope. Although operations can be described as a sequential process, some of the operations can in fact be performed in parallel, concurrently, and/or in a distributed environment, and with program code stored locally or remotely for access by single or mufti-processor machines. In addition, in some embodiments the order of operations can be rearranged without departing from the spirit of the disclosed subject matter. It will be appreciated by those skilled in the art that the present disclosure can be embodied in other specific forms without departing from the spirit or essential characteristics thereof. The presently disclosed embodiments are therefore considered in all respects to be illustrative and not restrictive. The scope of the disclosure is indicated by the appended claims rather than the foregoing description, and all changes that come within the meaning, range, and equivalence thereof are intended to be embraced therein. It should be emphasized that the term "comprises/comprising/including" when used in this specification is taken to specify the presence of stated features, integers, operations, steps or components but does not preclude the presence or addition of one or more other features, integers, steps, components or groups thereof.

The invention claimed is:

1. An intraoral scanning device comprising:
a light source configured for emitting light;
a beam splitter configured for outputting linearly polarized light of a predefined orientation, wherein the beam splitter is arranged such that light from the light source is transmitted through the beam splitter;

an image sensor configured for acquiring one or more images; and a light absorbing unit for minimizing stray light on the image sensor, said light absorbing unit arranged on a surface of the beam splitter, comprising:

i. an antireflective coating; and ii. an absorbing layer configured to absorb stray light.

2. The intraoral scanning device according to claim 1, wherein the antireflective coating is arranged between the beam splitter and the absorbing layer, such that light transmitted through the antireflective coating is transmitted into the absorbing layer.

3. The intraoral scanning device according to claim 1, wherein the antireflective coating comprises one or more materials selected from the group of: tantalum pentoxide ($Ta_2O_5$), silicon dioxide ($SiO_2$), and magnesium fluoride ($MgF_2$).

4. The intraoral scanning device according to claim 1, wherein the antireflective coating comprises at least two layers of different material.

5. The intraoral scanning device according to claim 1, wherein the image sensor and the light absorbing unit are arranged on different sides of the beam splitter, such as on opposite sides of the beam splitter.

6. The intraoral scanning device according to claim 1, wherein the absorbing layer is made of a glass material having substantially the same refractive index as the beam splitter.

7. The intraoral scanning device according to claim 1, wherein the absorbing layer is attached to the beam splitter via a layer of optical cement having substantially the same refractive index as the beam splitter.

8. The intraoral scanning device according to claim 1, wherein the absorbing layer comprises a material selected from the group of black lacquer, carbon, aluminum (Al), silver (Ag), chromium (Cr), colored glass, an opaque material, and/or combinations thereof.

9. The intraoral scanning device according to claim 1, wherein the absorbing layer has an absorbance of 2 OD or higher, corresponding to a transmission through the absorbing layer of 1% or less.

10. The intraoral scanning device according to claim 1, wherein the scanning device further comprises a quarter-wave plate configured to convert linearly polarized light into circularly polarized light and vice versa.

11. The intraoral scanning device according to claim 1, wherein the beam splitter is further configured for transmitting linearly polarized light of a first orientation and redirecting linearly polarized light of a second orientation onto the image sensor, wherein the first and second orientations are orthogonal to each other.

12. The intraoral scanning device according to claim 1, wherein the intraoral scanning device further comprises a second light source configured to emit light at a second wavelength, wherein the second wavelength is selected from the range of 385 nm to 425 nm.

13. The intraoral scanning device according to claim 12, wherein the intraoral scanning device further comprises a long pass filter arranged in front of the image sensor, wherein the long pass filter has a predefined cut-off wavelength of 435 nm or lower, such that wavelengths below said cut-off wavelength are blocked by the filter.

14. The intraoral scanning device according to claim 12, wherein the intraoral scanning device further comprises a mask having a masking material configured to have a low transmission of light emitted by the light source, such that said light is patterned into a predefined pattern, and wherein the masking material is further configured to have a high transmission of the second wavelength.

15. The intraoral scanning device according to claim 1, wherein the scanning device is a focus scanning device.

16. An optical system for an intraoral scanning device, the optical system comprising:

a light source for emitting light;

a beam splitter configured to split an incident beam of light into two beams, wherein at least one of said beams is linearly polarized, wherein the beam splitter is made from two glass prisms attached together to form an interface, the beam splitter comprising:

a coating on the interface, wherein the coating is configured to separate unpolarized light into two different polarizations, whereby light of a first polarization state is transmitted through the interface and light of a second polarization state is reflected at the interface;

a long pass filter having a predefined cut-off wavelength, such that wavelengths below said cut-off wavelength are blocked by the filter, wherein the long pass filter is arranged on a first surface of the beam splitter; and a light absorbing unit comprising an absorbing layer for absorbing light, wherein the light absorbing unit is arranged on a second surface of the beam splitter.

17. The optical system according to claim 16, wherein the long pass filter and the light absorbing unit are integrated in the beam splitter to form a single unit.

18. The optical system according to claim 16, wherein the long pass filter and the light absorbing unit are arranged on opposite sides of the beam splitter.

19. The optical system according to claim 16, wherein the light absorbing unit further comprises an antireflective coating arranged between the beam splitter and the absorbing layer, such that light transmitted through the antireflective coating is transmitted into the absorbing layer.

20. An intraoral scanning device comprising the optical system according to claim 16.

* * * * *